United States Patent
Carlill et al.

(10) Patent No.: US 8,776,501 B2
(45) Date of Patent: Jul. 15, 2014

(54) REGENERATION ASSIST CALIBRATION

(71) Applicant: Perkins Engines Company Limited, Peterborough (GB)

(72) Inventors: Tom W. Carlill, Peterborough (GB); Jason Soilleux, Peterborough (GB); Alistair C. Farman, Peterborough (GB); Guy Blundell, Northampton (GB); Anthony C. Rodman, Cambridgeshire (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 13/941,637

(22) Filed: Jul. 15, 2013

(65) Prior Publication Data

US 2013/0298530 A1    Nov. 14, 2013

Related U.S. Application Data

(63) Continuation of application No. 12/644,492, filed on Dec. 22, 2009, now Pat. No. 8,631,642.

(51) Int. Cl.
*F01N 3/00* (2006.01)
*F01N 3/02* (2006.01)
*F01N 3/20* (2006.01)

(52) U.S. Cl.
USPC .............. 60/286; 60/277; 60/295; 60/297; 60/311

(58) Field of Classification Search
USPC ................ 60/274, 277, 286, 295, 297, 311
See application file for complete search history.

(56) References Cited

U.S. PATENT DOCUMENTS

| | | | |
|---|---|---|---|
| 4,756,155 A | 7/1988 | Shinzawa | |
| 4,926,636 A | 5/1990 | Tadokoro et al. | |
| 5,050,376 A | 9/1991 | Stiglic et al. | |
| 5,094,198 A | 3/1992 | Trotta et al. | |
| 6,490,857 B2 | 12/2002 | Sasaki | |
| 6,708,487 B2 | 3/2004 | Morimoto et al. | |

(Continued)

FOREIGN PATENT DOCUMENTS

| | | |
|---|---|---|
| DE | 10045548 | 4/2001 |
| EP | 0861973 | 9/1998 |

(Continued)

OTHER PUBLICATIONS

Fischer, Sebastian and Stein, Jens-Olaf, "Investigation on the Effect of Very High Fuel Injection Pressure on Soot-NOx Emissions at High Load in a Passenger Car Diesel Engine," SAE International, vol. 2, No. 2009-01-1930, pp. 1737-1748, Jun. 15, 2009.

*Primary Examiner* — Kenneth Bomberg
*Assistant Examiner* — Dapinder Singh
(74) *Attorney, Agent, or Firm* — Finnegan, Henderson, Farabow, Garrett & Dunner LLP

(57) ABSTRACT

A power system comprising an engine that produces exhaust, a fuel system that injects a fuel into the engine, an aftertreatment system that treats the exhaust, and is controller. The aftertreatment system includes an oxidation catalyst that converts NO from the engine into NO2, a particulate filter that traps soot from the engine, and a sensor that provides an indication of the amount of soot in the particulate filter. The controller increases an engine fuel injection pressure when the amount of soot in the particulate filter is above a threshold.

16 Claims, 7 Drawing Sheets

(56) References Cited

U.S. PATENT DOCUMENTS

| | | |
|---|---|---|
| 6,732,522 B2 | 5/2004 | Wright et al. |
| 6,804,601 B2 | 10/2004 | Wang et al. |
| 6,817,174 B1 | 11/2004 | Igarashi et al. |
| 6,843,055 B2 | 1/2005 | Ootake |
| 6,952,918 B2 | 10/2005 | Imai et al. |
| 6,966,179 B2 | 11/2005 | Onodera et al. |
| 7,191,743 B2 * | 3/2007 | Weber et al. ............... 123/90.11 |
| 7,219,493 B2 | 5/2007 | Tsutsumoto et al. |
| 7,316,107 B2 | 1/2008 | Aratsuka et al. |
| 8,156,730 B2 | 4/2012 | Guo et al. |
| 8,176,902 B2 | 5/2012 | Elsasser et al. |
| 2002/0157384 A1 | 10/2002 | Hirota et al. |
| 2004/0231323 A1 | 11/2004 | Fujita et al. |
| 2005/0044845 A1 | 3/2005 | Onodera et al. |
| 2005/0241597 A1* | 11/2005 | Weber et al. ............... 123/90.12 |
| 2005/0241611 A1* | 11/2005 | Weber et al. ................. 123/299 |
| 2006/0107658 A1* | 5/2006 | Hiranuma et al. ............. 60/297 |
| 2007/0251216 A1 | 11/2007 | Easley, Jr. et al. |
| 2007/0261395 A1 | 11/2007 | Mahnken et al. |
| 2007/0261680 A1 | 11/2007 | Farell et al. |
| 2008/0276603 A1 | 11/2008 | Winsor |
| 2009/0000604 A1 | 1/2009 | Bond et al. |
| 2009/0044520 A1 | 2/2009 | Farell et al. |
| 2009/0178392 A1 | 7/2009 | Niimi et al. |
| 2009/0263303 A1* | 10/2009 | Fokema et al. ............ 423/239.1 |
| 2010/0132357 A1 | 6/2010 | Elsasser et al. |
| 2011/0000470 A1 | 1/2011 | Roth |

FOREIGN PATENT DOCUMENTS

| | | |
|---|---|---|
| EP | 1375886 | 1/2004 |
| EP | 1512860 | 3/2005 |
| EP | 1582708 | 10/2005 |
| EP | 1582710 | 10/2005 |
| EP | 1108862 | 9/2006 |
| EP | 1867846 | 12/2007 |
| EP | 2060771 | 5/2009 |
| EP | 0445567 | 11/2009 |
| EP | 2143919 | 1/2010 |
| EP | 2143919 A1 | 1/2010 |
| GB | 2353328 | 2/2001 |
| JP | 60222551 | 11/1985 |
| JP | 6299893 | 10/1994 |
| JP | 2001059428 | 3/2001 |
| JP | 2003083034 | 3/2003 |
| JP | 2003278527 | 10/2003 |
| JP | 2003343287 | 12/2003 |
| JP | 2005282534 | 10/2005 |
| JP | 2005282535 | 10/2005 |
| JP | 2008025509 | 2/2008 |
| JP | 2008082292 | 4/2008 |
| JP | 2000337173 | 11/2009 |
| WO | WO 2007/046216 | 4/2007 |
| WO | WO 2008/086939 | 7/2008 |
| WO | WO 2008/145503 | 12/2008 |

* cited by examiner

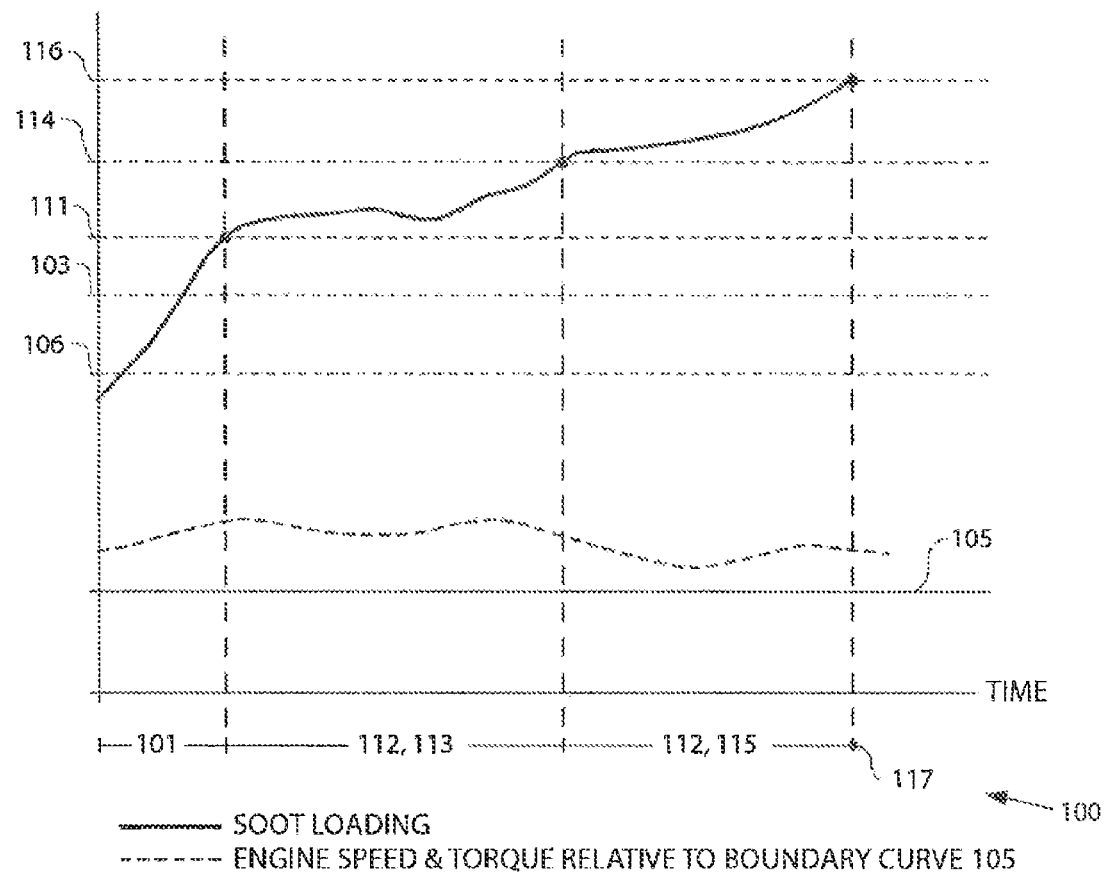

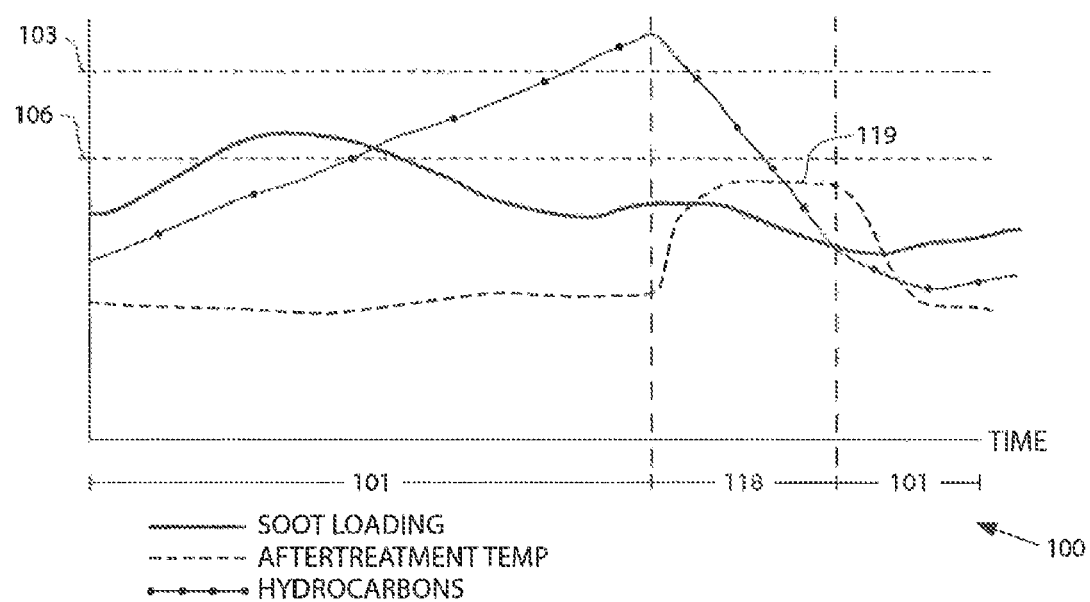

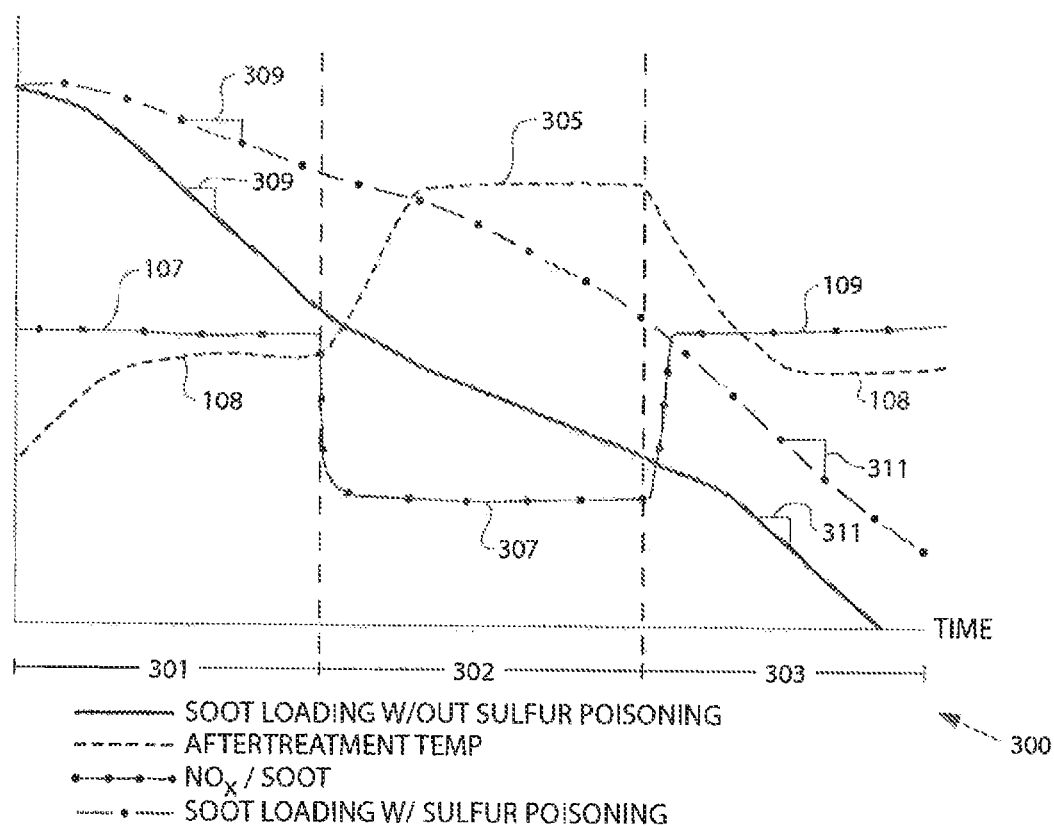

REGENERATION ASSIST CALIBRATION

This application is a continuation of U.S. application Ser. No. 12/644,492, filed Dec. 22, 2009.

TECHNICAL FIELD

The present disclosure relates to engine exhaust aftertreatment systems, and more particularly to the regeneration of a diesel particulate filter.

BACKGROUND

Aftertreatment systems may include diesel particulate filters that must be regenerated and may be deactivated by sulfur. European Patent Application Number 08160276.5 discloses an engine control system that changes the engine load and speed to bring a temperature of the exhaust gas above a limit temperature.

SUMMARY

In one aspect, the present disclosure provides a power system comprising an engine that produces exhaust, a fuel system that injects a fuel into the engine, an aftertreatment system that treats the exhaust, and a controller. The aftertreatment system includes an oxidation catalyst that converts NO from the engine into NO2, a particulate filter that traps soot from the engine, and a sensor that provides an indication of the amount of soot in the particulate filter. The controller increases an engine fuel injection pressure when the amount of soot in the particulate filter is above a threshold.

In another aspect, a power system is disclosed comprising an engine that produces exhaust, an aftertreatment system that treats the exhaust, and a controller. The aftertreatment system includes an oxidation catalyst that converts NO from the engine into NO2, a particulate filter that traps soot from the engine, and a sensor that provides an indication of the amount of soot in the particulate filter. The controller changes operating parameters of the power system to raise a NOx/soot ratio in the exhaust to greater than 35/1 when the amount of soot in the particulate filter is above a threshold.

In yet another aspect, a method is disclosed of temporarily raising a NOx/soot ratio in an exhaust produced by an engine to greater than 35/1 by at least in part increasing an engine fuel injection pressure.

Other features and aspects of this disclosure will be apparent from the following description and the accompanying drawings.

BRIEF DESCRIPTION OF THE DRAWINGS

FIG. 7 is a graphical representation of soot loading in a diesel particulate filter exceeding a threshold and illustrating the engine's responses.

FIG. 8 is a graphical representation of hydrocarbon levels in a diesel particulate filter during a hydrocarbon removal calibration.

FIG. 9 is a graphical representation of a temperature profile and of soot loading profiles during a sulfur detection routine.

DETAILED DESCRIPTION

Figure 1:
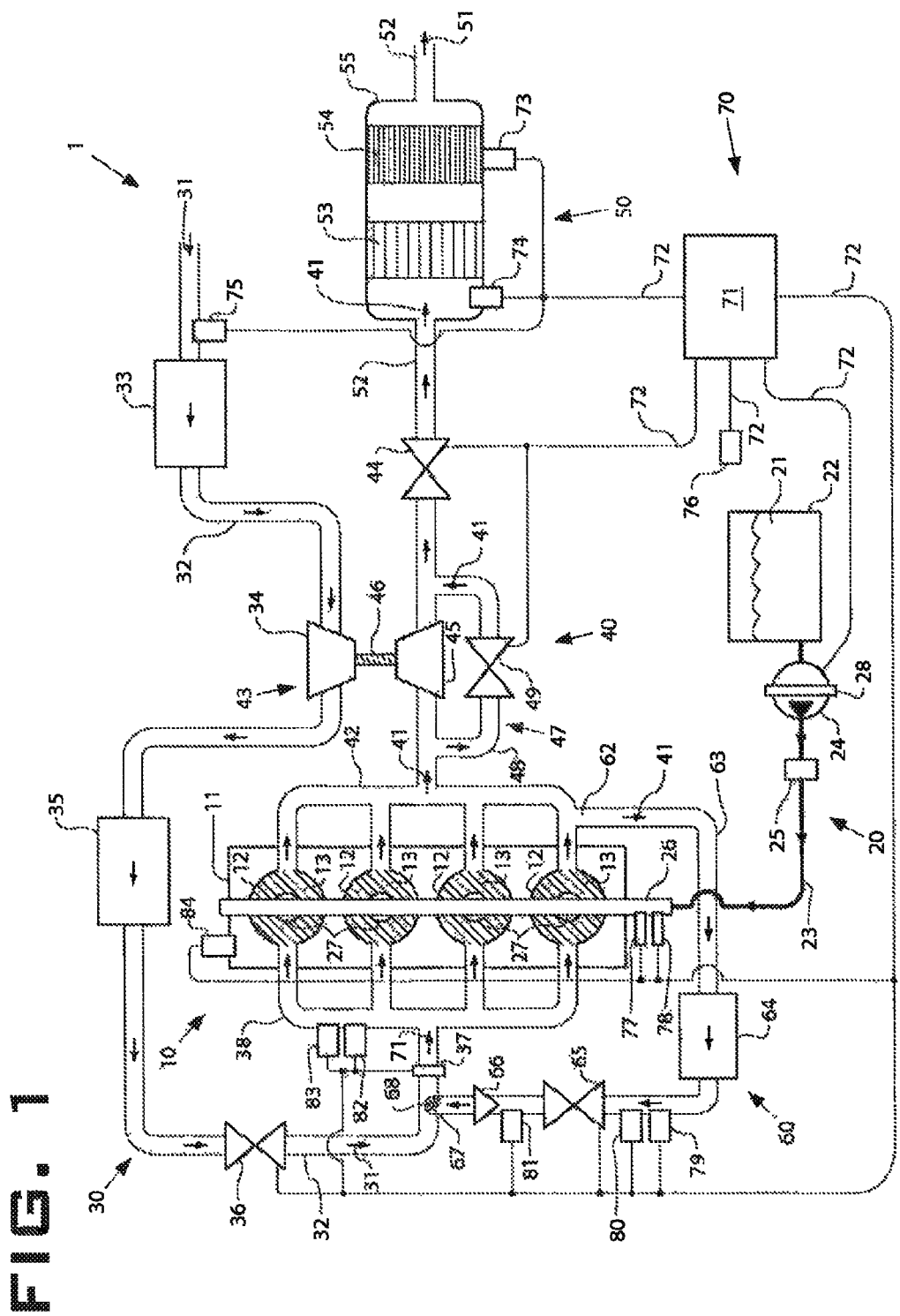
FIG. 1 is a diagrammatic view of a power system.

As seen in FIG. 1, a power system 1 includes an engine 10 and multiple other systems. These systems include a fuel system 20, an air intake system 30, an exhaust system 40, an aftertreatment system 50, an exhaust gas recirculation (EGR) system 60, and an electrical system 70. The power system 1 may include other features not shown, such as cooling systems, peripheries, drivetrain components, etc.

The engine 10 creates the power for the power system 1. The engine 10 includes a block 11, cylinders 12, and pistons 13. The pistons 13 reciprocate within the cylinder 12 to drive a crankshaft. The engine 10 may be any type of engine (internal combustion, gas, diesel, gaseous fuel, natural gas, propane, etc.), may be of any size, with any number of cylinders, and in any configuration ("V," in-line, radial, etc.). The engine 10 may be used to power any machine or other device, including on-highway trucks or vehicles, off-highway trucks or machines, earth moving equipment, generators, aerospace applications, locomotive applications, marine applications, pumps, stationary equipment, or other engine powered applications.

The fuel system 20 delivers a fuel 21 to the engine 10. The fuel system 20 includes a fuel tank 22, fuel line 23, fuel pump 24, fuel filter 25, fuel rail 26, and fuel injectors 27. The fuel tank 22 contains the fuel 21 and the fuel line 23 delivers the fuel 21 from the fuel tank 22 to the fuel rail 26. The fuel pump 24 draws the fuel 21 from the fuel tank 22 and passes the fad 21 to the fuel rail 26. In some embodiments, more than one fuel pump 24 may be used with a downstream fuel pump 24 having higher pressure capabilities than an upstream fuel pump 24. The fuel 21 may also pass through one or more fuel filters 25 to clean the fuel 21.

The fuel 21 is passed to the fuel injectors 27 via the fuel rail 26 and the fuel 21 is delivered into each cylinder 12 via the corresponding fuel injector 27. The fuel injectors 27 may include solenoid or piezoelectric valves to deliver the injection. The fuel rail 26 is pressurized by operation of the fuel pump 24. The fuel pump 24 may include a swash plate 28 that controls the compression ratio of the fuel pump 24. Changes in the swash plate 28 or other changes to the operation of the fuel pump 24 can be used to vary the pressure of the fuel 21 in the fuel rail 26 and therefore change the engine fuel injection pressure. The fuel system 20 is described above as a common rail fuel system, but other embodiments may be adapted for other fuel systems, such as unit injector systems.

The air intake system 30 delivers fresh intake air 31 to the engine 10. The air intake system 30 includes an airline 32, air cleaner 33, compressor 34, intake air cooler 35, intake valve 36, intake air heater 37, and intake manifold 38. The fresh intake air 31 is sucked in through the airline 32 and passes into the cylinder 12. The fresh air 31 is first drawn through the air cleaner 33, is then compressed by the compressor 34, and next cooled by the intake air cooler 35. The fresh air 31 may then pass through the intake valve 36 and intake air heater 37. The fresh air 31 is then delivered to the engine 10 via the intake manifold 38. Engine intake valves associated with each cylinder 12 may be used to deliver the air to the cylinders 12 for combustion.

The exhaust system 40 routes raw exhaust 41 from the engine 10 to the aftertreatment system 50. The exhaust system 40 includes an exhaust manifold 42, turbo 43, and backpressure valve 44. The backpressure valve 44 may include any controllable restriction placed on the exhaust, including a smart engine brake.

The turbo 43 includes the compressor 34, a turbine 45, a turbo shaft 46, and a wastegate 47. The turbine 45 is rotationally connected to the compressor 34 via the turbo shaft 46. The wastegate 47 includes a wastegate passage 48 and a wastegate valve 49. The wastegate passage 48 connects from upstream to downstream of the turbine 45 and the wastegate valve 49 is disposed inside the wastegate passage 48. In some embodiments a wastegate 47 may not be needed or included. In some embodiments the turbo 43 may include an asymmetric turbine 45 and separate exhaust manifolds 42 that may be used to drive EGR. In other embodiments the turbo 43 may include a variable geometry turbine 45 and separate exhaust manifolds 42 that may be used to drive EGR. Some embodiments may also include one or more additional turbos 43 in series or in parallel.

The backpressure valve 44 is downstream of the turbine 45 and upstream of the aftertreatment system 50. In other embodiments, the backpressure valve 44 may be located in the aftertreatment system 50, in the exhaust manifold 42, or elsewhere downstream of the engine 10.

The raw exhaust 41 is expunged from the engine 10 via the engine exhaust valves and is routed through the exhaust manifold 42 to the turbine 45. The hot raw exhaust 41 drives the turbine 45, which drives the compressor 34, and compresses the fresh intake air 31. The wastegate passage 48 allows the raw exhaust 41 to by-pass the turbine 45 when the wastgate valve 49 is opened. The wastegate passage 48 is controlled to regulate turbo 43 boost pressure and the wastegate valve 49 may be configured to open once a threshold boost pressure is reached.

The aftertreatment system 50 receives raw exhaust 41 and refines it to produce cleaned exhaust 51 that is routed to the atmosphere. The aftertreatment system 50 includes an exhaust conduit 52, a diesel oxidation catalyst (DOC) 53, and a diesel particulate filter (DPF) 54, which may be a catalyzed DPF 54. The DOC 53 and DPF 54 may be housed in a single canister 55, as shown, or individual canisters. An aftertreatment temperature represents the temperature of the DOC 53 and DPF 54 inside the canister 55. A muffler may also be included in the aftertreatment system 50.

The DOC 53 oxidizes Nitrogen monoxide (NO) into Nitrogen dioxide (NO2). The DOC 53 includes a catalyst or precious metal coating on a substrate. The substrate may have a honeycomb or other elongated channel structure or other high surface area configuration. The substrate may be made from cordierite or another suitable ceramic or metal. The precious metal coating may consist mainly of Platinum, though other catalytic coatings may be used. In one embodiment, the DOC 53 may have a precious metal loading of between 10 and 50 grams per cubic foot on a 200 to 600 cell per square inch DOC. While it may be used, a Palladium coating may not be needed because it is normally used for temperature stability above 500 degrees Celsius. The DOC may also include a washcoat coating to help hold the precious metal coating and provide additional reaction sites. The washcoat may be Alumina (AL2O3) based, or based on another suitable material.

Different types of DOCs are configured for different types of aftertreatment systems with different DPF 54 regeneration strategies. These different DPF 54 regeneration strategies may include low temperature, dosing, and upstream heat. The DOC 53 of the current aftertreatment system 50 may be characterized as a low temperature aftertreatment system DOC 53 because the DPF 54 is passively regenerated at relatively low temperatures. These low temperature DOCs require high precious metal loadings to achieve the level of NO2 production needed, but may not require Palladium for thermal stability.

Dosing DOCs require high precious metal loadings to create the quantity of exothermic reactions needed. These dosing DOCs may also require Palladium for thermal stability because of the temperatures that may be involved. The total precious metal loading of these dosing DOCs may be similar to the precious metal loading of the low temperature DOC described above.

Upstream heat DOCs are used for aftertreatment systems where a heat source, such as a heater or burner, is upstream of the DPF 54 to provide the heat for DPF 54 regeneration. These upstream heat DOCs do not require high precious metal loadings because the heat is coming from another source. However, these upstream heat DOCs may require Palladium for thermal stability because of the higher temperatures that may be involved. Aftertreatment temperatures greater than 500 degrees Celsius are often needed in these systems. These upstream heat DOCs may have a precious metal loading of between 5 and 25 grams per cubic foot on a 200 to 400 cell per square inch DOC. Because of the lower precious metal loadings, the upstream heat DOCs may be cheaper than the low temp or dosing DOCs.

The DPF 54 collects particulate matter (PM) or soot. The DPF 54 may also include a catalyst or precious metal and washcoat to help the DOC 53 with the oxidization of NO into Nitrogen dioxide (NO2). The catalyst of the DPF 54 is coated on a substrate with a honeycomb or other elongated channel or thin wall structure. The DPF 54 substrate may be more porous than the DOC 53 substrate and every other channel may be blocked with half the channels blocked at the inlet end and half blocked at the outlet end. This increased porosity and the blocked channels encourage wall flow of the exhaust. The wall how causes the soot to be filtered and collected in the DPF 54.

Like the DOC, different types of DPFs are configured for different types of aftertreatment systems with different DPF 54 regeneration strategies. For instance, the upstream heat aftertreatment systems may not need a DPF with any or only relatively little catalyst because less passive regeneration is needed.

Variations to the aftertreatment system 50 are possible. For instance, The DOC 53 may be enlarged, reducing or eliminating the need for any catalyst on the DPF 54. The DPF 54 may also be enlarged and the amount of catalyst coated increased to eliminate the need for the DOC 53. The types of catalysts may also be changed. Catalysts may also be added to fuel supply.

The aftertreatment system 50 may also include a Selective Catalytic Reduction (SCR) system to reduce NO and NO2 into N2. The SCR system may include a SCR catalyst and reductant system to add a supply of reductant in the SCR catalyst.

The EGR system 60 routs raw exhaust 41 to the air intake system 30, where the raw exhaust 41 mixes with the fresh air 31 to create a mixed air 61. The mixed air 61 is then delivered to the engine 10. Because the raw exhaust 41 has already been combusted by the engine 10 it contains less oxygen and is more inert than fresh air 31. Therefore the combustion of the mixed air 61 by the engine 10 generates less heat, which inhibits the formation of NOx.

The EGR system 60 includes an EGR take-off 62, an EGR line 63, an EGR cooler 64, an EGR valve 65, a reed valve 66, an EGR introduction port 67, and one or more EGR mixers 68. The EGR take-off 62 is fluidly coupled to the exhaust manifold 42 and EGR line 63. In other embodiments, the EGR take-off 62 may be isolated to a single or a single set of cylinders(s). In yet other embodiments, the EGR take-off 62 may be further downstream, possibly after or in the aftertreatment system 50. The EGR system 60 may also be adapted to be in-cylinder. The EGR cooler 64 is disposed in the EGR line 63 down stream of the EGR take-off 62. In some embodiments, the EGR cooler 64 and intake air cooler 35 may be combined. Some embodiments also may not include reed valves 66.

The EGR valve 65 is disposed in the EGR line 63 downstream of the EGR cooler 64. The reed valve 66 is disposed in the EGR line 63 downstream of the EGR valve 65. In other embodiments, the EGR valve 65 and/or reed valve 66 may be disposed upstream of the EGR cooler 64. The EGR introduction port 67 is fluidly connected to the EGR line 63 downstream of the reed valve 66. The EGR mixer 68 extends into the intake airline 32 to introduce and mix the raw exhaust 41 into the fresh air 31 to create the mixed air 61. In some embodiments the reed valve 66 and EGR mixer 68 may not be needed or included.

The electrical system 70 receives data from power system 1 sensors, processes the data, and controls the operation of multiple components in the power system 1. The electrical system 70 includes a controller 71, wiring harness 72, and a plurality of sensors. The controller 71 may embody an electronic control module (ECM) or another processor capable of receiving, processing, and communicating the needed data. The controller 71 may also embody multiple units working together. The controller 71 may be in communication with and/or control more or fewer components than is shown in the current embodiment. The controller 71 is configured or programmed to receive data and control the components of the power system 1 as described herein.

The sensors are all connected to the controller 71 via the wiring harness 72. In other embodiments wireless communication may be used instead of the wiring harness 72. The sensors may include a soot loading sensor 73, aftertreatment inlet temperature sensor 74, air intake temperature sensor 75, barometric pressure sensor 76, rail fuel temperature sensor 77, rail fuel pressure sensor 78, EGR gas temperature sensor 79, EGR valve inlet pressure sensor 80, EGR valve outlet pressure sensor 81, intake manifold temperature sensor 82, intake manifold pressure sensor 83, and an engine speed sensor 84. An EGR valve position sensor may also be included or the EGR valve position may be determined based on known command signals.

The soot loading sensor 73 provides an indication of the amount of soot loading in the DPF 54. The soot loading sensor 73 provides a reading corresponding to the mass or quantity of soot per volume of the DPF 54. The amount of soot loading may be expressed as a % of a maximum acceptable soot load for the DPF 54. The maximum acceptable soot load for the DPF 54 may be determined as the load at which the likelihood of a thermal event in the DPF 54 becomes higher than an arbitrary limit or threshold amount. Therefore, it is possible for the soot loading to be greater than 100% but it is not desirable.

The soot loading values may need to be corrected for different altitudes or barometric pressures which may be determined by the barometric pressure sensor 76. The soot loading values may also need to be corrected for an accumulation of ash in the DPF 54 over time. This correction may be made using a model or sensor that estimates the amount of ash. The more accurate and responsive the soot loading sensor 73, the more precisely the 100% soot loading value can be assigned.

In one embodiment, the soot loading sensor 73 may embody a radio frequency (RF) sensor. Such an RF sensor may pass radio frequencies through the DPF 54 and measure attenuated frequencies as an indication of particulate loading in the DPF 54. The soot loading sensor 73 may also measure other aspects inside or across the DPF 54 as an indication of soot loading. For instance, the soot loading sensor 73 may measure a pressure differential or temperature differential across the DPF 54. The soot loading sensor 73 may also embody a computer map, model, or algorithm that predicts particulate loading over time.

The aftertreatment inlet temperature sensor 74 measures the temperature of the raw exhaust 41 entering the aftertreatment system 50. The aftertreatment temperature may be determined via the aftertreatment inlet temperature sensor 74. The aftertreatment temperature may also be determined in other ways. For example, the aftertreatment temperature may be determined or extrapolated from engine maps, infrared temperature sensors, temperature sensors located upstream or downstream, or pressure sensors.

The air intake temperature sensor 75 measures the ambient temperature of the fresh air 31 entering the air intake system 30. The barometric pressure sensor 76 measures the barometric pressure of the power system 1 environment as an indication of altitude. The rail fuel temperature sensor 77 and rail fuel pressure sensor 78 measure the temperature and pressure inside the fuel rail 26 which is the engine fuel injection pressure. The EGR gas temperature sensor 79 measure the temperature of the raw exhaust 41 being mixed with the fresh air 31. The EGR valve inlet pressure sensor 80 and EGR valve outlet pressure sensor 81 measure the pressure on either side of the EGR valve 65. The intake manifold temperature sensor 82 and intake manifold pressure sensor 83 measures the temperature and pressure inside the intake manifold 38. The engine speed sensor 84 may measure the speed of the engine 10 by measuring speed of the camshaft, crankshaft, or other engine 10 component.

The wiring harness 72 is also connected to the backpressure valve 44, wastegate valve 49, fuel pump 24, engine 10, fuel injectors 27, EGR valve 65, intake valve 36, and intake air neater 37. The contract 71 controls the backpressure valve 44, wastegate valve 49, fuel pump 24, engine 10, fuel injectors 27, FOR valve 65, intake valve 36, and intake air heater 37.

The engine 10 generates soot that is collected by the DPF 54. The main constituent of soot is Carbon (C). The NO contained in the raw exhaust 41 is converted into NO2 as it passes over the DOC. The NO2 is next brought into contact with the Carbon trapped in the DPF 54. The NO2 from the DOC 53 and Carbon trapped in the DPF 54 then react to produce CO2 and NO, burning the soot. If the DPF is catalyzed the NO may be again converted to NO2 to enable further soot oxidation.

Above an aftertreatment light-off temperature the reactions described above may occur at a rate sufficient to burn at least as much soot as is being trapped, or to continuously regenerate the DPF 54. The aftertreatment light-off temperature may be approximately 230 degrees Celsius. In other embodiments, the aftertreatment light-off temperature may be between approximately 200 and 260 degrees Celsius. As the aftertreatment temperature rises above light-off temperature, the rate of reactions described above increase and the DPF 54 regenerates faster. Regeneration under these conditions may be referred to as low temperature regeneration.

FIGS. 2, 3, and 5-8 are graphical representations of power system operating conditions. It should be understood that the values presented are meant to be illustrative of aspects of the present disclosure and are not necessarily representative of expected or experienced data sets.

Figure 2:
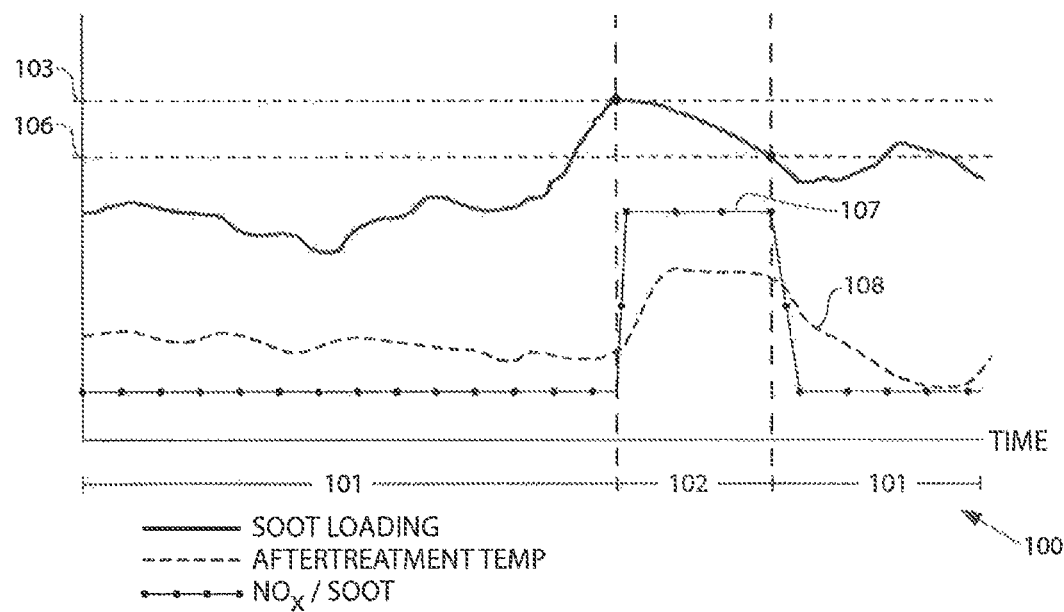
FIG. 2 is a graphical representation of soot loading in a diesel particulate filter during a first operation mode and a second operation mode.

As seen in FIG. 2, under some engine 10 work or duty cycles or environments the aftertreatment temperature is high enough for a sufficient amount of time to continuously regenerate the DPF 54. However, FIG. 2 also shows that in some duty cycles or environments the aftertreatment temperature may be insufficient and the soot loading in the DPF may reach a regeneration activation soot threshold 103.

In order to account for situations where the regeneration activation soot threshold 103 is reached, the engine 10 includes a control system 100 that operates in either a first operation mode 101 or a second operation mode 102. The second operation mode 102, which may also be called a regeneration assist calibration, creates power system 1 conditions conducive to cause DPF 54 regeneration. Under most engine 10 work or duty cycles or environments and while the DPF 54 is under the regeneration activation soot threshold 103 the control system 100 operates the engine 10 in the first operation mode 101, which may also be called a standard calibration. The second operation mode 102 is described as being used with a low temperature aftertreatment system but may also be used in conjunction with the dosing or upstream heat aftertreatment systems to assist in regeneration.

Figure 3:
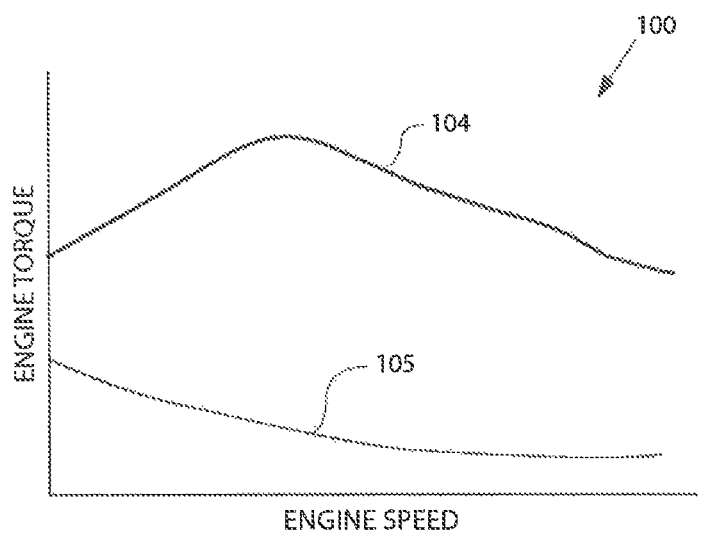
FIG. 3 is a graphical representation of an engine speed-torque map and a boundary speed-torque curve under which a second operation mode is enabled.

FIG. 3 shows a graph of engine speed versus engine torque. The graph includes a peak rated speed-torque curve 104 and a threshold or boundary speed-torque curve 105. The boundary speed-torque curve 105 may be associated with engine 10 conditions that result in an aftertreatment temperature of above a light-off temperature of the DOC under normal operating conditions to enable continuous regeneration of the DPF 54. In one embodiment, the light-off temperature may be approximately 230 degrees Celsius. In other embodiments, the speed-torque curve 105 may associated with other aftertreatment temperature thresholds.

The shape of the boundary speed-torque curve 105 may change depending on the power system 1 and its installation. The engine 10 speed is determined by the engine speed sensor 84. The engine 10 torque is calculated as a function of engine 10 speed and a quantity of fuel 21 injected. The area under the boundary speed-torque curve 105 may be determined by a map populated with the engine speed and torque values.

If the engine 10 speed-torque is above the boundary speed-torque curve 105 then the second operation mode 102 is disabled and only the first operation mode 101 is employed. If the DPF 54 reaches the regeneration activation soot threshold 103 and the engine 10 speed and torque is below the boundary speed-torque curve 105 then the control system 100 operates the engine 10 in the second operation mode 102.

Once a regeneration deactivation soot threshold 106 is reached the control system 100 activates the first operation mode 101 again. Following this drop below the regeneration deactivation soot threshold 106, the second operation mode 102 will not be reactivated until the regeneration activation soot threshold 103 is again reached.

The establishment of the regeneration activation soot threshold 103 and regeneration deactivation soot threshold 106 is determined to avoid the use of the second operation mode 102 to the extent possible. In some embodiments the regeneration activation soot threshold 103 may be approximately 90%. In other embodiments, the regeneration activation soot threshold 103 may be between 70% and 100%, 85% and 95%, greater than 80%, or greater than 90%. In some embodiments the regeneration deactivation soot threshold 106 may be approximately 80%, in other embodiments, the regeneration deactivation soot threshold 106 may be between 65% and 85%, greater than 70%, or greater than 80%.

If the engine 10 speed and torque rises above the boundary speed-torque curve 105 while the engine 10 is in the second operation mode 102, then the second operation mode 102 may be interrupted and the first operation mode 101 will be activated. If following this interruption, the engine 10 speed and torque again drops below the boundary speed-torque curve 105 and the soot loading is above the regeneration deactivation soot threshold 106, then the second operation mode 102 will be reactivated. Once the engine 10 is shut off any history regarding whether the second operation mode 102 was active or whether an interruption had occurred may be lost or may be retained to continue operation of second operation mode 102 as though the no interruption occurred. The history may also be configured to be lost after a predetermined or threshold amount after the engine 10 is shutoff.

Figure 4:
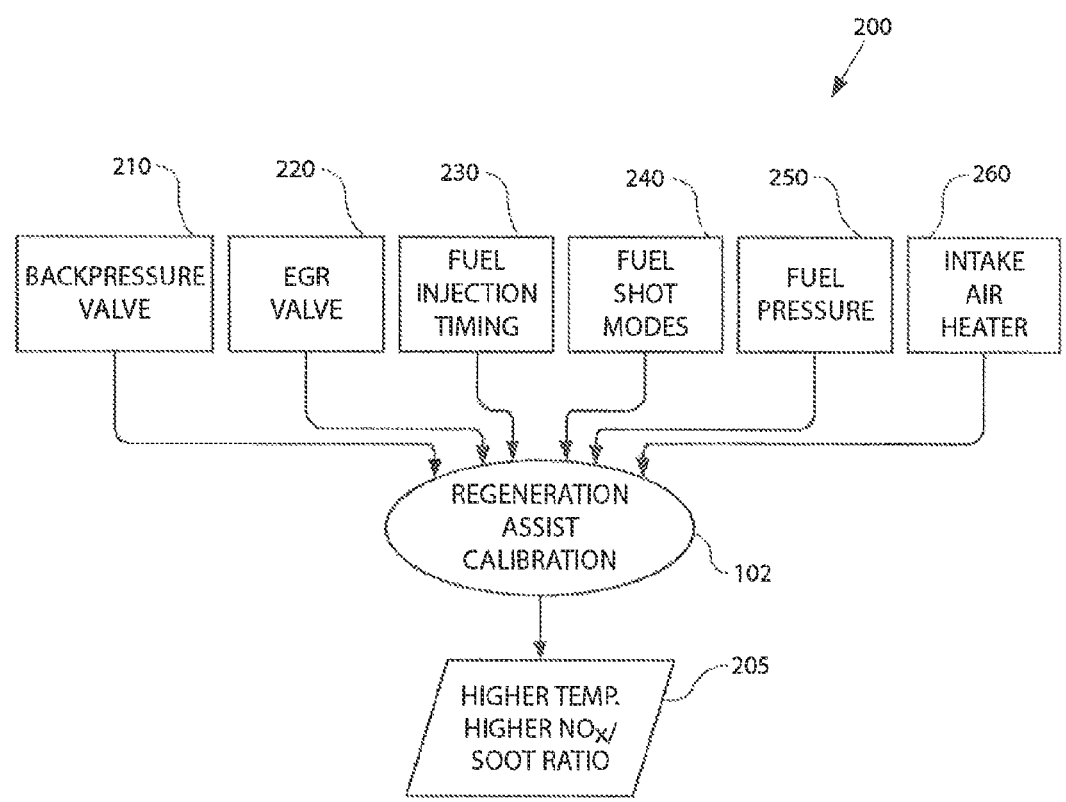
FIG. 4 is a block diagram of strategies used in a second operation mode.

The second operation mode 102 is illustrated in FIG. 4. The second operation mode 102 employs a set of regeneration strategies 200 to create an engine outcome 205. The engine outcome 205 involves a higher exhaust temperature and a higher NOx/soot ratio. In this way the control system 100 achieves a target NOx/soot ratio 107 and target regeneration temperature 108 to accomplish regeneration of the DPF 54, as seen in FIG. 2. The target NOx/soot ratio 107 results in an accelerated low temperature continuous regeneration that may shorten the amount of time the second operation mode 102 is needed.

During the first operation mode 101, the NOx/soot ratio produced by the engine 10 may be greater than 20 grams of NOx per one gram of soot. During the second operation mode 102, the target NOx/soot ratio 107 produced by the engine 10 may risen to be greater than 35 grams of NOx per one gram of soot. In other embodiments, the target NOx/soot ratio 107 may be greater than 45 grams of NOx per one gram of soot during the second operation mode 102. In yet other embodiments, the target NOx/soot ratio 107 may be greater than 50 grams of NOx per one gram of soot during the second operation mode 102. The target NOx/soot ratio 107 may also be between 45 and 55 grams of NOx per one gram of soot during the second operation mode 102. In some embodiments, the target soot ratio 107 produced by the engine 10 may be approximately 50 grams of NOx per one gram of soot.

During the second operation mode 102 the target regeneration temperature 108 is above the light-off temperature and may be in a range between 200 and 400 degrees Celsius. In other embodiments the target regeneration temperature 108 is greater than 230 degrees Celsius during the second operation mode 102.

As described above, the DOC converts NO to NO2 and the NO2 reacts with the Carbon in the DPF 54 to form CO2 and NO. The second operation mode 102 increases the NOx/soot ratio in the raw exhaust 41 so that more NO2 is available to react with soot to form CO2 and NO at a faster rate. As mentioned above, the second operation mode 102 must also increase the temperature of the raw exhaust 41 to raise the aftertreatment temperature above the light-off temperature to enable these reactions. The second operation mode 102 also reduces the amount of soot in the raw exhaust 41 so that less Carbon is being trapped and the total soot loading in the DPF will be reduced faster.

In order to achieve the outcome 205, the second operation mode 102 employs multiple regeneration strategies 200 that change the operating parameters of the engine. These regeneration strategies 200 may include a backpressure valve strategy 210, EGR valve strategy 220, fuel injection timing strategy 230, fuel shot mode strategy 240, fuel pressure strategy 250, and an intake air heater strategy 260. While each individual strategy may impact NOx, temperature, and soot in different ways, they all work together to raise the aftertreatment temperature and raw exhaust 41 NOx/Soot ratio.

The type of regeneration strategies described herein are associated by some with reduced fuel efficiencies, increased engine 10 noise, reduced transient response, and added cost and complication. However, the power system 1 and control system 100 of the present disclosure minimizes these concerns.

The second operation mode 102 will, under most operating conditions, rarely be needed or used. The second operation mode 102 and use of the regeneration strategies 200 also actually reduces the additional hardware (heaters, burners, (losers, etc.) required by other DPF regeneration systems. The use of multiple regeneration strategies 200 together may also help maximize the NOx/soot ratio and temperature to assist regeneration or achieve accelerated regeneration of the DPF 54 and reduce the length of time the second operation mode 102 is utilized or needed. While the second operation mode 102 may result in an increase in the amount of soot, it also increases the amount NOx more so that a higher NOx/soot ratio results. Alternatively, the second operation mode 102 may reduce NOx and reduce soot more so that a higher NOx/soot ratio again results.

The high NOx/soot ratio also reduces the temperatures and time at temperature needed for regeneration of the DPF 54, which reduces the thermal stress on the DPF 54 and any aging or deactivation of the DPF 54. The aging of the DPF 54 may include the sintering of the catalyst, which may block channels and reduce performance as a function of time and temperature.

The time needed for the second operation mode 102 to lower the soot loading of the DPF 54 below the regeneration deactivation soot threshold 106 may range between approximately 20 minutes and 60 minutes. The time required varies depending largely on various conditions that also impact the aftertreatment temperature and may be longer or shorter than the times mentioned. The conditions affecting the time needed for the second operation mode 102 to lower the soot loading of the DPF 54 below the regeneration deactivation soot threshold 106 may include ambient air temperature, parasitic load levels, low engine idle speed, exhaust conduit 52 length, design and sizing of the air intake system 30, turbo 43 arrangements, insulation, engine compartment size, and many other factors.

The backpressure valve strategy 210 involves closing the backpressure valve 44. Closing the backpressure valve 44 increases the pressure in the exhaust system 40, causing the governor to increase the amount of fuel 21 injected in the engine 10 to maintain the engine 10 speed. The increase in the fuel 21 injected may result in a decrease in fuel efficiency, but it also results in an increase in the temperature of the raw exhaust 41 and aftertreatment temperature.

The amount the backpressure valve 44 is closed depends upon the engine 10 speed. The backpressure valve 44 is closed by an amount to achieve the needed aftertreatment temperature whilst avoiding an engine 10 stall. At low speeds the backpressure valve may be 98% closed at maximum, while at higher speed the backpressure valve 44 may be only 60% closed at maximum. The percentage the backpressure valve 44 is closed is the percentage of cross sectional area in the exhaust conduit obstructed compared to when the backpressure valve 44 is fully opened. The percentage that the backpressure valve is closed may vary based on the specific valve design being used.

At low speeds the closing of the backpressure valve 44 may cause a pressure differential between the intake manifold 38 and exhaust manifold 42 of between 150 and 300 kPa, compared to a pressure differential of between 3 and 7 kPa when not closed. At high speeds the closing of the backpressure valve 44 may cause a pressure differential between the intake manifold 38 and exhaust manifold 42 of between 50 and 100 kPa, compared to a pressure differential of between 40 and 50 kPa when not closed. The pressure differential ranges listed above may vary based on turbo 43 size and match and other power system 1 changes.

The closing of the backpressure valve 44 may be done at a slow rate to build pressure at a slow controlled rate in the exhaust manifold 42. The amount the backpressure valve 44 is closed and the corresponding pressure differentials discussed above may depend greatly on a number of factors, including the turbo 43 type/sizing/match, intake manifold 38 size, exhaust manifold 42 size, EGR line 63 size, backpressure from the aftertreatment system 50, and many other factors.

The operation of the backpressure valve 44 is controlled by the measured or determined pressure differential between the intake manifold 38 and exhaust manifold 42. The pressure in the intake manifold 38 is determined by the intake manifold pressure sensor 83. The pressure in the exhaust manifold 42 is determined by the EGR valve inlet pressure sensor 80. As described below, the EGR valve 65 is closed during the second operation mode 102 and therefore the pressure at the EGR valve inlet pressure sensor 80 will be the same as the pressure in the exhaust manifold 42. In an alternative embodiment, the pressure in the exhaust manifold 42 may be determined by a pressure sensor added in the exhaust manifold 42. The addition of a pressure sensor in the exhaust manifold 42 may be required if in an alternative embodiment the EGR valve is not completely closed or the EGR system 60 is not included or changed.

The operation of the backpressure valve 44 may also be controlled by the aftertreatment temperature. However, the pressure differential between the intake manifold 38 and exhaust manifold 42 may be more responsive. Using the aftertreatment temperature to control the operation of the backpressure valve 44 may require waiting for the temperature to rise as a result of the pressure differential.

Control based on aftertreatment temperature may be used if control based on pressure differential between the intake manifold 38 and exhaust manifold 42 does not result in a aftertreatment temperature that exceeds the light-off temperature of the DOC 53. The failure to reach the desired aftertreatment temperature despite achieving a targeted pressure differential between the intake manifold 38 and exhaust manifold 42 may be a result of cold ambient conditions or installations with aftertreatment systems 50 that are far downstream. In these situations, the backpressure valve 44 may be controlled based on the aftertreatment temperature and closed to a greater percentage than would be dictated by the pressure differential between the intake manifold 38 and exhaust manifold 42. In one embodiment, however, the pressure differential between the intake manifold 38 and exhaust manifold 42 will not be allowed to exceed a maximum value (for example 300 kPa).

Control based on the aftertreatment temperature may also be used if control based on pressure differential between the intake manifold 38 and exhaust manifold 42 results in the aftertreatment temperature exceeding a predetermined or threshold aftertreatment maximum temperature (for example 400 degrees Celsius). Exceeding the aftertreatment maximum temperature may result in damage to the DOC 53 and/or DPF 54, as described above. In these situations, the backpressure valve 44 may be controlled based on the aftertreatment temperature and opened a greater percentage than would be dictated by the pressure differential between the intake manifold 38 and exhaust manifold 42. Exceeding the aftertreatment maximum temperature may also result in a warning to the operator.

The operation of the backpressure valve 44 may also be controlled by the absolute pressure in the exhaust manifold 42. However, using the pressure differential between the intake manifold 38 end exhaust manifold 42 may reduce the need to account for the impact altitude has on absolute pressure.

If the backpressure valve 44 fails to close or respond to commands, the second operation mode 102 may be modified to use more or less of the other regeneration strategies 200 and/or de-rate the engine 10.

In order to keep the backpressure valve 44 functioning properly and to test its operation in What may be a harsh environment, movements of the backpressure valve 44 may be carried out. These movements may be done periodically (for example every 30 minutes). The degree of the movement may depend on an exhaust mass flow rate, with larger movements being done at lower exhaust mass flow rates and smaller movements at higher exhaust mass flow rate. The exhaust mass flow rate may be determined as a function of engine 10 speed, a sensor, output, or another power system 1 condition. The larger movements provide more benefit to backpressure valve 44 operation and testing, while smaller movements may be required at higher speeds to reduce the impact on engine 10 performance during the test. The movements of the backpressure valve 44 may also be restricted to only occur at low engine 10 speeds where performance impact is less of a concern.

An additional strategy or an alternative to the backpressure valve strategy 210 may be an intake valve strategy. Either or both the intake valve 36 or backpressure valve 44 may be referred to as regeneration valves that are used to assist in the regeneration of the DPF 54. In one embodiment, closing of the intake valve 36 reduces the amount of fresh intake air 31 being supplied to the engine 10 and increases pumping losses, which increases temperatures. The backpressure valve strategy 210 may be more effective than the intake valve strategy because the backpressure valve strategy 210 does not reduce manifold pressure and is therefore less susceptible to misfire. In some embodiments, the intake valve 36 may not be needed or included in the power system 1.

The EGR valve strategy 220 involves closing the EGR valve 65 during the second operation mode 102 or while the backpressure valve 44 is at least partially closed. However, the EGR valve 65 may not always need be closed while the backpressure valve 44 is at least partially closed, especially if the backpressure valve 44 is being used for thermal management of other aftertreatment devices, such as an SCR system or the DOC 53. Closing the EGR system 60 increases the amount of NOx produced. Closing the EGR system 60 also prevents high levels of flow through the EGR system 60 while the backpressure valve 44 is partially closed. This flow could cause an imbalance of raw exhaust 41 to fresh air 31 in the mixed air 61 and may reduce the effectiveness of the backpressure valve strategy 210.

In some embodiments, the backpressure valve 44 will be kept completely open or open to a greater extent than it otherwise would be if a failure of the EGR valve 65 to close occurs. The EGR valve strategy 220 may be eliminated in power systems without an EGR system or modified in power systems that have in-cylinder EGR systems.

The fuel injection timing strategy 230 involves either advancing or retarding the timing of the main injection. Whether or not the fuel injection timing is advanced or retarded is partially dependent on what the current fuel injection timing is in the first operation mode 101 for the current engine 10 speed and torque before activation of the second operation mode 102. The impact of changing the fuel injection timing may be heavily dependent on combustion dynamics which may be influenced by piston and head geometries, fuel spray patterns, air/fuel ratios, or other factors. Despite these uncertainties, advanced fuel injection timing may be associated with reduced soot and increased NOx, while retarded fuel injection timing may be associated with increased temperature, increased soot, and reduced NOx.

Because of these competing interests, whether the fuel injection timing is advanced or retarded depends on the impact the other regeneration strategies 200 in the second operation mode 102 can have on temperature, NOx, and soot at a given engine 10 speed and torque. For example, at high engine 10 speed and torque under the boundary speed-torque curve 105, aftertreatment temperature above the light-off temperature may be easy to obtain through other strategies, so the fuel injection timing is advanced to reduce soot. In contrast, at low engine 10 speed and torque under the boundary speed-torque curve 105, aftertreatment temperatures above the light-off temperature may be difficult to obtain through other strategies, so the fuel injection timing is retarded to assist in increasing the aftertreatment temperature.

The fuel shot mode strategy 240 involves adding fuel injection shots by the fuel injectors 27. In one embodiment, the fuel shot mode strategy 240 may add an early pilot shot (10 to 40 degrees before top dead center piston 13 position), a close coupled pilot shot (5 to 20 degrees before top dead center piston 13 position), a close coupled post (5 to 30 degrees after top dead center piston 13 position), or a late post (10 to 40 degrees after top dead center piston 13 position). Other embodiments may include a wide variety of alternative fuel injection shot patterns.

Each of these shots have different impacts that may be beneficial to achieving regeneration of the DPF 54, especially when coupled with the other regeneration strategies 200. Like the fuel injection timing strategy 230, whether the early pilot or late post or both are used will be dependent on the engine 10 speed and torque and the capability of the other regeneration strategies 200 to achieve the temperature, NOx, and soot levels needed for regeneration of the DPF 54. The addition of a late post shot may be associated with lowering soot and increasing temperature, and therefore may frequently be a part of the fuel shot mode strategy 240.

The fuel pressure strategy 250 involves increasing the fuel pressure in the fuel rail 26 for increased engine fuel injection pressures. Increased fuel injection pressures may increase noise levels but also increase NOx and lower soot. Higher fuel injection pressures improve the vaporization of the fuel 21 in the combustion chamber, which may cause the increase in NOx. The increased fuel pressure may also lower temperatures, but the other regeneration strategies 200 can be used to compensate for this impact and increase the temperature.

The fuel injection pressure during the second operation mode 102 may be greater than 1.5 times, 2 times, or 2.5 times that of the fuel injection pressure during the first operation mode 101. In addition, the fuel injection pressure may be gradually raised during the second operation mode 102 along a ramp. In one embodiment the fuel injection pressure during the second operation mode 102 may be between 60 and 70 MPa, compared with between 30 and 40 MPa during the first operation mode 101.

The intake air heater strategy 260 involves activating the intake air heater 37. Activating the intake air heater 37 adds a parasitic load to the engine 10 and heats the intake air being delivered to the combustion cylinder 12. Both of the effects result in higher exhaust temperatures and assist in regeneration. In some embodiments, the intake air heater 37 may not be needed or included.

At low idle engine 10 speeds, however, the alternator providing electric power to the intake air heater 37 and other electrical components of the engine 10 or machine may not be able to provide enough power. Therefore, a strategy is needed to only activate the intake air heater 37 to the degree and when needed. Accordingly, the intake air heater 37 may be activated by a closed loop control system based on intake air temperature and fuel consumption. The intake air temperature and fuel consumption are used to predict the resulting raw exhaust 41 temperature for a given usage of the intake air heater 37. The intake air heater 37 is then only activated to the degree needed to achieve the desired raw exhaust 41 temperature. The intake air temperature may be determined by the intake manifold temperature sensor 82. The fuel consumption value may be corrected based on engine 10 load or speed-torque as mass airflow and combustion heat will change and have an impact on the raw exhaust 41 temperature.

In alternative embodiments the intake air heater strategy 260 and intake air heater 37 may not be needed. The intake air heater strategy 260 and intake air heater 37 may only be needed when the ambient temperatures are very low (for example below negative 25 degrees Celsius) or on applications frequently running at low engine 10 idle or load.

In other alternative embodiments, the engine 10 idle speed may also be increased during the second operation mode 102. The engine 10 idle speed may also be increased in environments below a predetermined or threshold ambient temperature (for example, below 0 degrees Celsius). The ambient temperature of the environment may be determined by the fresh air intake temperature sensor 75. In other embodiments, the fresh air intake temperature sensor 75 may not be included and the temperature of the environment may be determined by other temperature sensors at engine 10 start-up, before the engine 10 heats up.

Other alternative embodiments may also include the use of one or more parasitic loads on the engine 10 as part of the second operation mode 102. The load on the engine 10 may be increased by activating a water pump, an air conditioner, a hydraulic pump, an electric generator, a fan, a heating system, a compressor, lights, or any other system drawing energy from the engine 10. If an SCR system is employed, the reductant supply may be increased leading up to and/or during the activation of the second operation mode 102 to account for the high levels of NOx the second operation mode 102 produces.

Figure 5:
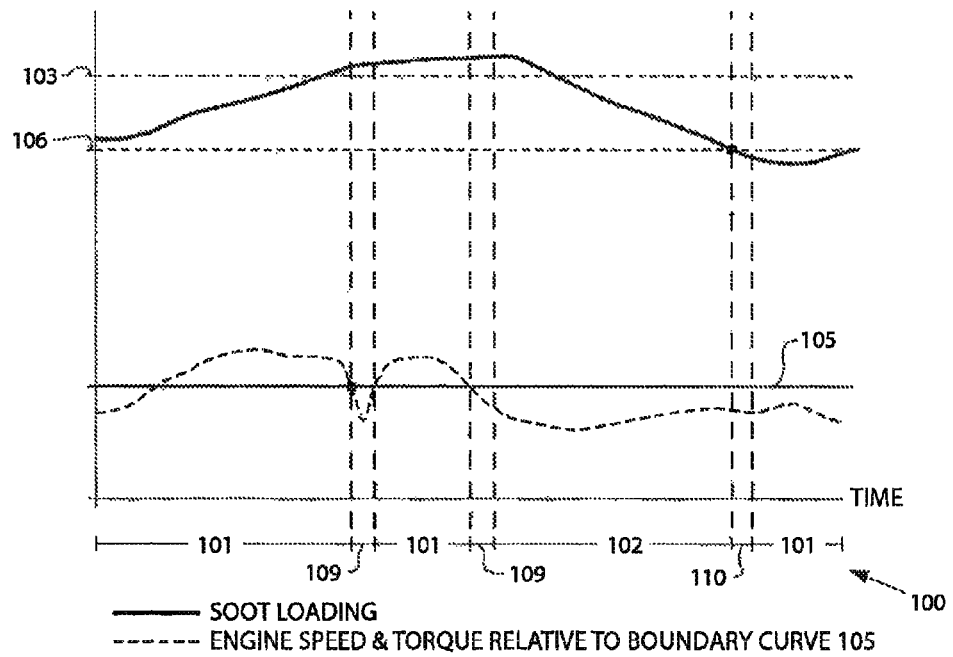
FIG. 5 is a graphical representation of soot loading in a diesel particulate filter illustrating a delay period and transition period.
Figure 6:
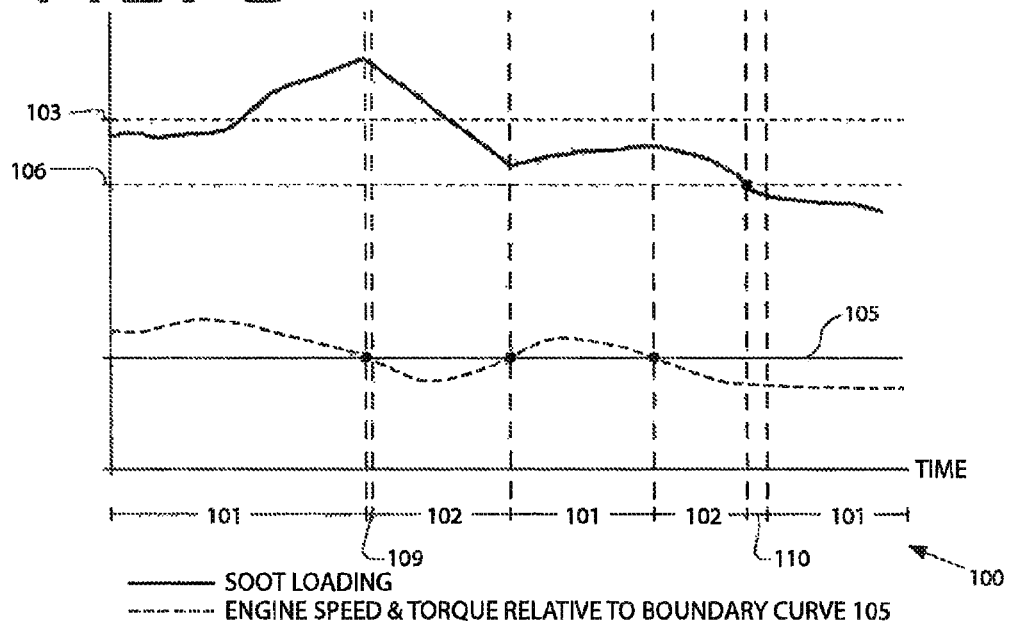
FIG. 6 is a graphical representation of soot loading in a diesel particulate filter illustrating a delay period and transition period.

To further illustrate aspects of the control system 100, FIGS. 5, 6, and 7 include a representation of the boundary speed-torque curve 105 from FIG. 3 as a function of time. For simplicity, FIGS. 5, 6, and 7 show the boundary speed-torque curve 105 as a flat line and also include a line representing the engine's 10 speed and torque relative to the boundary speed-torque curve 105. In this way, FIGS. 5, 6, and 7 illustrate times when the engine's 10 speed and torque are above and below the boundary speed-torque curve 105.

FIG. 5 shows that the control system 100 may also include a delay period 109. The delay period 109 is a delay before the second operation mode 102 is activated despite the soot loading being above the regeneration activation soot threshold 103 and the engine's 10 speed and torque dropping below the boundary speed-torque curve 105. Accordingly, the first operation mode 101 is active during the delay period 109.

The activation of second operation mode 102 may have a negative impact on responsiveness and performance. Therefore, the activation of second operation mode 102 may need to be avoided at times when an increase in engine 10 speed and torque are likely. Increases in engine 10 speed and torque often immediately follow drops in engine 10 speed and torque. For example, operators and machines often pause after completing a task before initiating another action or switching gears.

As shown in FIG. 5, the delay period 109 may be used to improve transient response by the engine 10 by keeping it in the first operation mode 101 during this pause. As such, the delay period 109 helps reduce the likelihood that the engine 10 speed and torque will return to above the boundary speed-torque curve 105 because of these pauses shortly after the second operation mode 102 is activated. The delay period 109 ends once the engine 10 speed and torque return above the boundary speed-torque curve 105.

The delay period 109 also ends after a predetermined or threshold amount of time greater than zero. In one embodiment, the delay period 109 may be approximately 30 seconds. In other embodiments, the delay period 109 may be between 0 and 50 seconds, greater than 10 seconds, or less than 50 seconds. The length of the delay period may be established based on experienced work conditions and therefore may vary greatly.

FIG. 6 also shows that the length of the delay period 109 may also change based on the level of soot loading. The soot loading in FIG. 6 is higher than in FIG. 5 when the engine 10 dropped below the boundary speed-torque curve 105. Because of the higher soot loading, more priority is given to regeneration of the DPF 54 than providing responsiveness for a possible engine 10 speed and torque increase. Therefore, the length of the delay period 109 is shortened. The length of the delay period 109 may be shortened on a sliding scale as a function of soot loading.

In one embodiment, the delay period 109 may be shortened to approximately 3 seconds after the soot loading increases by more than 10% over the regeneration activation soot threshold 103. In other embodiments, the delay period 109 may be shortened to between 1 and 30 seconds, between 1 and 7 seconds, greater than 3 seconds, less than 3 seconds, or zero seconds after the soot loading increases by more than 10% over the regeneration activation soot threshold 103. The length of the delay period 109 may also change based on machine implement status, machine gear, engine 10 idle, or operator presence.

The delay period 109 may apply to all the regeneration strategies 200 or may only apply to a portion of the regeneration strategies 200 employed. In one embodiment, the delay period 109 may only apply to the backpressure valve strategy 210. Some embodiments of the control system 100 also may not include the delay period 109 or a delay period 109 that changes.

FIG. 5 also shows that the control system 100 may include a transition period 110. The transition period 110 may be added at the end of the second operation mode 102 to smooth the transition back to the first operation mode 101. The transition period 110 may also be added between other engine 10 calibration or operating mode changes.

During the transition period 110, the regeneration strategies 200 are slowly changed from the second operation mode 102 back to the first operation mode 101. This slow change may lessen the change in noise, vibration, and/or performance noticed by the operator during the change.

In one embodiment, the transition period 110 may apply to the backpressure valve strategy 210. During the second operation mode 102 the backpressure valve 44 is partially closed. Immediately opening the backpressure valve 44 may cause a load noise and possible vibration as pressure is quickly released. Therefore, during the transition period 110, the backpressure valve 44 may be slowly opened to release the pressure slowly. This slow release of pressure may reduce the noise and vibration otherwise experienced as the engine 10 returns to the first operation mode 101.

While the rate of backpressure valve 44 movement may vary greatly, in one example the backpressure valve 44 may be moved at as rate to achieve full movement in a time between 4 and 5 seconds during the transition period 110. In other embodiments the backpressure valve 44 may be moved at a rate to achieve full movement in between 1 and 10 seconds, 3 and 6 seconds, grater than 5 seconds, greater than 2 second, or greater than 1 second. The rate at which the backpressure valve 44 is moved may vary depending on the backpressure involved, mass airflow, and a rate of acceptable pressure release.

As seen in FIG. 6, this transition period 110 and slow movement of the backpressure valve 44 may not always be allowed because the transition period 110 may reduce transient response of the engine 10. If a load is placed on the engine 10, causing the engine 10 speed and torque to exceed the boundary speed-torque curve 105 and end the second operation mode 102, then no or only a limited transition period 110 may be included before returning to the first operation mode 101. In this situation the backpressure valve 44 will be opened as fast as possible or faster than during the transition period 110.

Without transition period 110, the backpressure valve 44 may achieve full movement in a time less than 1 second. In one embodiment, the backpressure valve 44 may achieve 90% of its full movement in 150 milliseconds when no transition period 110 is included. This fast opening may cause a rapid decompression of pressure or pressure release in the exhaust system 40. This rapid pressure decompression may cause some noise and possible vibrations, but could be mostly masked by the increasing engine 10 speed and torque. In other embodiments the use of a transient period 110 may be inhibited during a high rate of change in the engine 10 speed and torque.

As seen in FIG. 7, additional corrective action may be taken if the soot loading in the DPF 54 rises above the regeneration activation soot threshold 103 Various reasons may cause this to happen, including extreme cold ambient temperatures, high altitudes, sulfur deactivation of the DOC 53 or DPF 54 (discussed more below), engine 10 malfunction, or unintended application installation configurations.

If the soot loading reaches a mild de-rate soot threshold 111 that is above the regeneration activation soot threshold 103 then the operator may be warned and the engine 10 put into a reduced soot calibration 112. Use of the reduced soot calibration 112 may be regardless of whether the engine 10 is above or below the boundary speed-torque curve 105. In some embodiments the mild de-rate soot threshold 111 may be approximately 100%. In other embodiments, the mild de-rate soot threshold 111 may be between 80% and 110%, 95% and 105%, greater than 90%, or greater than 100%.

The reduced soot calibration 112 reduces the amount of soot produced by the engine 10 in an effort to reduce the soot loading in the DPF 54. The reduced soot calibration 112 may not use all of the regeneration strategies 200 used in the second operation mode 102. In one embodiment, the reduced soot calibration 112 closes the EGR valve 65 more than called for by the first operation mode 101 to achieve reduced FOR flow. The decreased EGR flow may increase combustion efficiency and reduce soot. Other aspects of the first operation mode 101, however, may not be changed by the reduced soot calibration 112.

The reduced soot calibration 112 may also include a mild de-rate 113 of the engine 10. The amount of fuel provided to the engine during the mild de-rate 113 may vary depending on the specific engine (10) and specific installation or application. The mild de-rate 113 of the engine 10 may involve approximately 85% of the normal fuel amount being provided to engine 10. In other embodiments, the mild de-rate 113 of the engine 10 may involve approximately between 50% and 95%, between 70% and 90%, or less than 95% of the normal fuel amount being provided to engine 10. The degree of mild de-rate 113 used may also be increased on a sliding scale as the soot loading increases.

This reduced fuel amount during the mild de-rate 113 may also decrease engine 10 speed and help move the engine 10 speed and torque under the boundary speed-torque curve 105 (depending on load). If the engine 10 speed-torque does go below the boundary speed-torque curve 105, then the second operation mode 102 may be used.

If the soot loading reaches a full de-rate soot threshold 114 that is above the mild de-rate soot threshold 111 then the operator may again be warned and the engine 10 put into a full de-rate 115. The reduced soot calibration 112 described above may or may not also be used. Use of the full de-rate 115 may be regardless of whether the engine 10 is above or below the boundary speed-torque curve 105. In some embodiments the full de-rate soot threshold 114 may be approximately 120%. In other embodiments, full de-rate soot threshold 114 may be between 90% and 140%, 115% and 125%, greater than 100%, or greater than 120%.

The full de-rate 115 may involve approximately 50% of the normal fuel amount being provided to engine 10. In other embodiments, the full de-rate 115 of the engine 10 may involve approximately between 20% and 80%, between 40% and 60%, or less than 70% of the normal fuel amount being provided to engine 10.

Like the mild de-rate 113, the full de-rate 115 may decrease engine 10 speed and help move the engine 10 speed and torque under the boundary speed-torque curve 105 (depending on load). If the engine 10 speed and torque does go below the boundary speed-torque curve 105, then the second operation mode 102 may be used.

If the soot loading reaches a shutdown soot threshold 116 that is above the full de-rate soot threshold 114 then an engine shutdown event 117 may occur. In some embodiments the shutdown soot threshold 116 may be approximately 140%. In other embodiments, the shutdown soot threshold 116 may be between 110% and 160%, 125% and 155%, greater than 110%, or greater than 140%.

An operator may also receive a warning and/or the engine 10 may be de-rated if the second operation mode 102 is being used more frequently than a predetermined or threshold value or than expected.

The soot loading sensor 73 may not be calibrated below a certain aftertreatment temperature. If the engine 10 is operating for an extended period of time below this aftertreatment temperature the control system 100 may temporarily modify the first operation mode 101 to raise the aftertreatment temperature to get a reading from the soot loading sensor 73. If the soot loading sensor 73 fails, then the soot loading of the DPF 54 may be assumed to always be above the regeneration activation soot threshold 103 and below the mild de-rate soot threshold 111.

In certain embodiments, the second operation mode 102 may be disabled during engine 10 warm up after engine 10 start-up. The second operation mode 102 may be disabled fur a predetermined or threshold amount of time after start-up or until a predetermined or threshold coolant or oil temperature is reached after start up. Combustion quality is often poor after engine 10 start-up and before the engine 10 warms up. Activating the second operation mode 102 may degrade the combustion quality even more.

FIG. 8 shows that the control system 100 may also include a hydrocarbon removal calibration 118. Engine 10 exhaust is also known to contain hydrocarbons (HC) that may also be collected in the aftertreatment system 50 at temperatures below the light off temperature of the catalyst. Most hydrocarbons pass through the DOC 53 and DPF 54, but some may be collected or stored on the catalyst. If allowed to build up, the hydrocarbons will create white smoke when the engine 10 speed and torque is increased and high exhaust flow occurs.

Above a hydrocarbon removal temperature 119, hydrocarbons can be removed from the aftertreatment system 50. Above this hydrocarbon removal temperature 119 the hydrocarbons react to form Carbon Dioxide ($CO_2$) and Water ($H_2O$). The hydrocarbon removal temperature 119 may be approximately 180 degrees Celsius.

Because temperatures well above the hydrocarbon removal temperature 119 are reached when the second operation mode 102 is activated, the hydrocarbons will be removed when the second operation mode 102 is activated. The hydrocarbons will also be removed anytime the engine 10 speed and torque cause the aftertreatment temperature to exceed the hydrocarbon removal temperature 119.

However, there are times when the aftertreatment temperature does not exceed the hydrocarbon removal temperature 119 for a long time and not enough soot is being produced by the engine 10 to cause sufficient soot loading in the DPF 54 to trigger the second operation mode 102. This may occur if the engine 10 is running at low idle or under low loads for long periods of time. During these times, the hydrocarbon removal calibration 118 may be used.

The hydrocarbon removal calibration 118 may be similar to the second operation mode 102. However, the hydrocarbon removal calibration 118 does not need to reach as high of temperatures as the second operation mode 102 or obtain the NOx/soot levels needed for DPF 54 regeneration. Therefore, the hydrocarbon removal calibration 118 may employ fewer strategies and/or may employ the strategies to less of a degree than the second operation mode 102. For example, the hydrocarbon removal calibration 118 may only involve between 0% and 70% less of a pressure differential between the intake manifold 38 and the exhaust manifold 42 than the second operation mode 102 requires.

The control system 100 may also include a sulfur detection routine 300 to detect sulfur deactivation. Sulfur deactivation may be prevented or reduced through the use of low or ultra-low sulfur fuel 21. The sulfur detection routine 300 detects when sulfur deactivation has occurred and therefore may provide an indication that low sulfur fuel was not used.

As seen in FIG. 9, the sulfur detection routine 300 includes the engine 10 operating in a pre-regeneration calibration 301, followed by a sulfur removal calibration 302, followed by a post-regeneration calibration 303. The pre-regeneration calibration 301, and the post-regeneration calibration 303 may substantially embody the same regeneration strategies 200 as the second operation mode 102. In one embodiment, the pre-regeneration calibration 301 and/or the post-regeneration calibration 303 is identical to the second operation mode 102. The sulfur removal calibration 302, or a variation of the sulfur removal calibration 302, may also be used alone, independent of the sulfur detection routine 300, to remove sulfur. Strategies besides the regeneration strategies 200 may also be used by the sulfur detection routine 300. For instance, the desired aftertreatment temperatures in the sulfur detection routine 300 may be achieved by influencing other engine 10 operating parameters, fuel fired burners, electric heaters, hydrocarbon dosing, and other techniques.

The soot loading sensor 73 measures the soot during this sulfur detection routine 300 and the controller 71 determines whether the DOC 53 and DPF 54 have been deactivated by sulfur. Sulfur deactivation impacts the performance of the DOC 53 and DPF 54. Sulfur in the fuel 21 forms $SO_2$ during combustion. The catalyst on the DOC 53 and DPF 54 oxidizes the $SO_2$ to form $SO_3$, which is stored on the precious metal catalyst. Sulfur may also be stored on the washcoat.

The sulfur stored on the DOC 53 and DPF 54 masks reaction sites, decreasing the efficiency of the catalytic reaction and thereby reducing the production of $NO_2$. The reduced production of $NO_2$ reduces the rate at which the soot burned. Because of this reduced rate of soot burning, the DPF 54 may begin to fail to regenerate above the boundary speed-torque curve 105. Therefore the second operation mode 102 may be needed more often. Sulfur deactivation may also cause the second operation mode 102 to become ineffective. Aftertreatment temperatures greater than 300 degrees Celsius may be used to recover the reaction sites and drive off the sulfur from the DOC 53 and DPF 54.

If the second operation mode 102 is frequently being used or the DPF 54 is failing to regenerate, the sulfur detection routine 300 may be used to determine if the cause is sulfur in the fuel instead of another failure in the power system 1. Such failures may include a deactivated DOC 53 or DPF 54 or failure of another power system 1 component that would cause the second operation mode 102 to be ineffective.

FIG. 9 shows a temperature profile during the sulfur detection routine 300. To initiate the sulfur detection routine, the DPF 54 needs a degree of soot loading. That degree of soot loading may be greater than 80%. In other embodiments a soot loading of greater than 90% may be needed. An operator or service technician may initiate the sulfur detection routine 300 and it may be done as part of a service routine. In other embodiments, the sulfur detection routine 300 may be done automatically.

The sulfur detection routine 300 begins with the pre-regeneration calibration 301. During the pre-regeneration calibration 301 the target regeneration temperature 108 and the regeneration NOx/soot ratio 107 is achieved as discussed above with regard to the second operation mode 102 to regenerate the DPF 54.

During the sulfur removal calibration 302 the aftertreatment temperature rises to a desulphation temperature 305. The desulphation temperature 305 may be higher than the target regeneration temperature 108 and may be between 300 and 500 degrees Celsius. In one embodiment, the desulphation temperature 305 may be between 400 and 450 degrees Celsius.

The sulfur removal calibration 302 may run for an amount of time to remove all or some of the sulfur for the DOC 53 and DPF 54. The temperature may be controlled by the difference between intake and exhaust manifold pressure and/or the aftertreatment inlet temperature sensor 74. If an aftertreatment temperature of higher than 500 degrees Celsius is reached the DOC 53 may be damaged unless palladium or another high temperature stabilizer is added, as discussed above. The desulphation temperature 305 may be above the maximum aftertreatment temperature described above since the sulfur detection routine 300 is rarely used and reaches the desulphation temperature 305 for a relatively short amount of time.

In some embodiments, strategies may be used to maximize exhaust temperature and not the NOx/soot ratio to achieve a reduced NOx/soot ratio 307 during the sulfur removal calibration 302. This reduced NOx/soot ratio 307 may slow the rate of regeneration and avoid all the soot from being removed during the sulfur removal calibration 302. In one embodiment the reduced NOx/soot ratio 307 is less than 35/1.

Next, the aftertreatment temperature decreases to the target regeneration temperature 108 and the regeneration NOx/Soot ratio 107 is achieved during the post-regeneration calibration 303 as discussed above to regenerate the DPF 54, with a target regeneration temperature 108 of between 200 and 400 degrees Celsius being achieved.

The post-regeneration calibration 303 may run for a predetermined or threshold amount of time or end only after achieving the regeneration deactivation soot threshold 106. In one embodiment, the pre-regeneration calibration 301 and the post-regeneration calibration 303 may each be run for approximately 30 minutes. The sulfur removal calibration 302 may be run for a predetermined or threshold amount of time sufficient to remove a substantial amount of sulfur. In one embodiment, the sulfur removal calibration 302 may be run for between 30 and 60 minutes. In other embodiments, the sulfur removal calibration 302 may be ran for less than 30 minutes.

FIG. 9 also shows a soot loading profile without sulfur deactivation and a soot loading profile with sulfur deactivation during the sulfur detection routine 300. The sulfur detection routine 300 compares a pre-soot removal rate 309 during the pre-regeneration calibration 301 with a post-soot removal rate 311 during the post-regeneration calibration 303. If the post-soot removal rate 311 is significantly faster or greater than the pre-soot removal rate 309 than sulfur deactivation is determined to have occurred.

In other embodiments, a change in the rate of soot removal during sulfur removal calibration 302 may be used to detect sulfur deactivation. If sulfur deactivation had occurred, the rate of soot removal will increase over time as more and more sulfur is removed. Other embodiments may also compare the rate during the second operation mode 102 to an expected rate, however these comparisons may not be accurate because of other uncontrolled changes.

The soot loading sensor 73 may need a high level of resolution, responsiveness, and/or accuracy to make the use of the second operation mode 102 a practical method of regenerating the DPF 54. The soot loading sensor 73 may need the capability of operating over a wide operating range soot loadings. For instance, a pressure differential soot loading sensor may only work at higher loads and therefore may not be sufficient to trigger the second operation mode 102 at the regeneration activation soot threshold 103 of 90% or terminate the second operation mode 102 at the regeneration deactivation soot threshold 106 of 80%. The pressure differential soot loading sensor may also only work at higher engine 10 speed and torque or exhaust mass air flows and therefore may not be sufficient to trigger the second operation mode 102 when the engine 10 speed and torque is below the boundary speed-torque curve 105. An oxidation model may not provide the level of accuracy needed with potentially long intervals between regenerations. A responsive and accurate soot loading sensor 73 is also needed by the sulfur detection routine 300 to determine and compare rates of regeneration.

An RF sensor may provide the level of resolution, responsiveness, and accuracy needed by the soot loading sensor 73. However, the present disclosure does contemplate that a wide variety of soot loading sensors 73 may be employed, including the pressure differential soot loading sensor and an oxidation model.

Industrial Applicability

The description above discloses a number of different items. A power system is disclosed comprising an engine that produces exhaust, a fuel system that injects a fuel into the engine, an aftertreatment system that treats the exhaust, and a controller. The aftertreatment system includes an oxidation catalyst that converts NO from the engine into NO2, a particulate filter that traps soot from the engine, and a sensor that provides an indication of the amount of soot in the particulate filter. The controller increases a engine fuel injection pressure by the fuel system when the amount of soot in the particulate filter is above a threshold. The controller may change additional power system operating parameters to raise the temperature of the exhaust to achieve an aftertreatment temperature greater than 200 degrees Celsius. The power system may also include an exhaust system that routes the exhaust from the engine to the aftertreatment system and a backpressure valve disposed in the exhaust system, wherein the backpressure valve at least partially closes when the amount of soot in the particulate filter above a threshold. The power system may also include an exhaust gas recirculation system that recirculates the exhaust from the engine back to an intake of the engine and an exhaust gas recirculation valve disposed in the exhaust gas recirculation system, wherein the exhaust gas recirculation valve partially closes when the backpressure valve at least partially closes. The fuel system may inject a main shot of fuel and the controller may change a timing of the main shot of fuel when the amount of soot in the particulate filter is above a threshold. The fuel system may also inject a main shot of fuel and the controller may add an additional shot of fuel before or after the main shot of fuel when the amount of soot in the particulate filter is above a threshold. The controller may increase the engine fuel injection pressure or fuel rail pressure when an engine speed and torque are below a threshold speed and torque curve.

A power system is also disclosed comprising an engine that produces exhaust, an aftertreatment system that treats the exhaust, and a controller. The aftertreatment system includes an oxidation catalyst that converts NO from the engine into NO2, a particulate filter that traps soot from the engine, and a sensor that provides an indication of the amount of soot in the particulate filter. The controller changes operating parameters of the power system to raise a NOx/soot ratio in the exhaust to greater than 35/1 when the amount of soot in the particulate filter is above a threshold. The controller may also change power system operating parameters to raise the temperature of the exhaust to achieve an aftertreatment temperature greater than 200 degrees Celsius. The controller may also increase an engine fuel injection pressure when the amount of soot in the particulate filter is above a threshold. The power system may also include an exhaust system that routes the exhaust from the engine to the aftertreatment system and a backpressure valve disposed in the exhaust system, wherein the controller at least partially closes the backpressure valve when the amount of soot in the particulate filter is above a threshold. The power system may also include an exhaust gas recirculation system that recirculates the exhaust from the engine back to an intake of the engine and an exhaust gas recirculation valve disposed in the exhaust gas recirculation system, wherein the controller closes the exhaust gas recirculation valve when the backpressure valve at least partially closes. The fuel system may inject a main shot of fuel and the controller may change a timing of the main shot of fuel when the amount of soot in the particulate filter is above a threshold. The fuel system may inject a main shot of fuel and the controller may add an additional shot of fuel before or after the main shot of fuel when the amount of soot in the particulate filter is above a threshold. The controller may change the operating parameters of the engine when an engine speed and torque are below a threshold speed and torque curve.

Also disclosed is a power system comprising an engine, a fuel system, an aftertreatment system, and a controller. The aftertreatment system includes an oxidation catalyst configured to convert NO from the engine into NO2, a particulate filter configured to trap soot from the engine, and a sensor configured to provide an indication of the amount of soot in the particulate filter. The controller is configured to increase an engine fuel injection pressure when the amount of soot in the particulate filter is above a threshold. The controller may be further configured to change additional power system operating parameters to achieve a aftertreatment temperature greater than 200 degrees Celsius. The power system may also include an exhaust system configured to route exhaust from the engine to the aftertreatment system and a backpressure valve disposed in the exhaust system. The backpressure valve may be configured to at least partially close when the amount of soot in the particulate filter is above a threshold. The power system may also include an exhaust gas recirculation system configured to recirculate the exhaust from the engine back to an intake of the engine and an exhaust gas recirculation valve disposed in the exhaust gas recirculation system. The exhaust gas recirculation valve may be configured to close when the backpressure valve at least partially closes. The fuel system may be configured to inject a main shot of fuel and the controller may be configured to change a timing of the main shot of fuel and add an additional shot of fuel before or after the main shot of fuel when the amount of soot in the particulate filter is above a threshold. The controller may also be configured to increase the engine fuel injection pressure when an engine speed and torque are below a threshold speed and torque curve.

Also disclosed is a method of temporarily raising a NOx/soot ratio in an exhaust produced by an engine to greater than 35/1 by at least in part increasing a engine fuel injection pressure. The method may also include one or more of: closing a backpressure valve disposed in an exhaust conduit, closing an exhaust gas recirculation valve disposed in an exhaust gas recirculation system that recirculates the exhaust from the engine back to an intake of the engine, changing a fuel injection timing of when a main injection of fuel is injected into the engine relative to the position of a piston in the engine, and injecting a shot of fuel either before or after the main injection wherein the shot of fuel is smaller than the main injection. The NOx/soot ratio in the exhaust may also be raised when an engine speed and torque are below a threshold speed and torque curve and an amount of soot in a particulate filter receiving the exhaust is above a threshold. The temperature of the exhaust may be raised to achieve an aftertreatment temperature greater than 200 degrees Celsius when the NOx/soot ratio in the exhaust is raised. The NOx/soot ratio may also be raised to greater than 50/1.

A power system is also disclosed comprising an engine that produces exhaust, an aftertreatment system that treats the exhaust and includes a particulate filter that traps soot from the engine, and a controller configured to perform a sulfur detection routine that conducts a pre-regeneration calibration to achieve a temperature in the aftertreatment system of between 200 and 400 degrees Celsius and following the pre-regeneration calibration conducts a sulfur removal calibration to achieve a temperature in the aftertreatment system of between 300 and 500 degrees Celsius. The aftertreatment system may include an oxidation catalyst that converts NO from the engine into NO2 upstream of the filter. Following the sulfur removal calibration, the sulfur detection routine may conduct a post-regeneration calibration to achieve a temperature in the aftertreatment system of between 200 and 400 degrees Celsius. The power system may also include a sensor that provides an indication of the amount of soot in the particulate filter. Readings from the sensor may be used to indicate that at least one of the oxidation catalyst and the particulate filter have been deactivated by sulfur. The pre-regeneration calibration and post-regeneration calibration may achieve a NOx/soot ratio in the exhaust of greater than 35/1. The pre-regeneration calibration, sulfur removal calibration, and post-regeneration calibration may include at least one of the following strategies: increasing a engine fuel injection pressure, partially closing a backpressure valve disposed in an exhaust conduit, closing an exhaust gas recirculation valve disposed in an exhaust gas recirculation system that recirculates the exhaust from the engine back to an intake of the engine, changing a fuel injection timing of when a main injection of fuel is injected into the engine relative to the position of a piston in the engine; and injecting a shot of fuel either before or after the main injection wherein the shot of fuel is smaller than the main injection. A rate of soot removal during the pre-regeneration calibration may be compared against a rate of soot removal during the post-regeneration calibration to indicate that at least one of the oxidation catalyst and the particulate filter have been deactivated by sulfur. The pre-regeneration calibration may be conducted immediately before the a sulfur removal calibration and the post-regeneration calibration may be conducted immediately after the a sulfur removal calibration. The pre-regeneration calibration, the sulfur removal calibration, and the post-regeneration calibration may be conducted for a predetermined amount of time. The sulfur detection routine may be triggered by an operator. The sulfur detection routine may be enabled when the amount of soot in the particulate filter is sufficient to avoid removal of all the soot during the sulfur detection routine.

Also disclosed is a power system comprising an engine that produces exhaust, a fuel system that injects a fuel into the engine, an aftertreatment system that treats the exhaust and includes a particulate filter that traps soot from the engine, and a controller configured to perform a sulfur detection routine. The controller conducts a sulfur removal calibration to achieve a temperature in the aftertreatment system of between 300 and 500 degrees Celsius and following the sulfur removal calibration conducts a post-regeneration calibration to achieve a temperature in the aftertreatment system between 200 and 400 degrees Celsius. The aftertreatment system may also include an oxidation catalyst that converts NO from the engine into NO2 upstream of the filter and a sensor that provides an indication of the amount of soot in the particulate filter. Readings from the sensor may be used to indicate that at least one of the oxidation catalyst and filter have been deactivated by sulfur.

Also disclosed is a method of detecting sulfur in an aftertreatment system treating an exhaust from an engine. The method comprises comparing a rate of regeneration of a particulate filter after removing the sulfur against a rate of regeneration of a particulate filter before removing the sulfur. The method may include removing the sulfur by raising a temperature of the exhaust to achieve a temperature in the aftertreatment system of between 300 and 500 degrees Celsius. The regeneration of the particulate filter may include raising a NOx/soot ratio in the exhaust to greater than 35/1 and raising a temperature of the exhaust to achieve a temperature in the aftertreatment system of between 200 and 400 degrees Celsius. The regeneration of the particulate filter may also include at least one of the following strategies: increasing a engine fuel injection pressure; partially closing a backpressure valve disposed in an exhaust conduit; closing an exhaust gas recirculation valve disposed in an exhaust gas recirculation system that recirculates the exhaust from the engine back to an intake of the engine; changing a fuel injection timing of when a main injection of the fuel is injected into the engine relative to the position of a piston in the engine; and injecting a shot of fuel either before or after the main injection wherein the shot of fuel is smaller than the main injection. The method may be enabled when an amount of soot in the particulate filter is sufficient to avoid removal of all the soot during removal of the sulfur.

A power system is also disclosed comprising an engine that produces exhaust, a particulate filter that traps soot from the engine, and a controller that switches the power system from a first operation mode into a second operation mode to regenerate the particulate filter wherein a transition between the first operation mode and the second operation mode occurs at a slower rate when an amount of soot in the particulate filter changes relative to a threshold than when a load on the engine changes. The second operation mode may include an actuating of a regeneration valve and the regeneration valve may actuate at the slower rate when the amount of soot in the particulate filter changes relative to the threshold than when the load on the engine increases. A transition from the second operation mode back to the first operation mode may occur at the slower rate when the amount of soot in the particulate filter falls below the threshold than when the load on the engine increases. The second operation mode may include a closing of a regeneration valve and the regeneration valve may open at the slower rate when the amount of soot in the particulate filter falls below the threshold than when the load on the engine increases. The regeneration valve may be a backpressure valve disposed in an exhaust conduit routing the exhaust. The backpressure valve may open in greater than one second when the amount of soot in the particulate filter falls below the threshold and the backpressure valve may open in less than one second when the load on the engine increases. The backpressure valve may open in greater than two seconds when the amount of soot in the particulate filter falls below the threshold and the backpressure valve may open in less than one second when the load on the engine increases.

A power system is also disclosed comprising an engine that produces exhaust, an exhaust conduit routing the exhaust, a backpressure valve disposed in the exhaust conduit, and a controller that actuates the backpressure valve at a first rate under a first condition and actuates the backpressure valve at a second rate faster than the first rate under a second condition. The backpressure valve may actuate at the first rate after it is no longer needed and may actuate at the second rate when the backpressure valve would inhibit a power demand on the engine. The power system may also include a particulate filter that traps soot in the exhaust and the backpressure valve may be used to regenerate the particulate filter. The backpressure valve may be no longer needed once the particulate filter no longer needs regeneration. The backpressure valve may close to regenerate the particulate filter and may open at either the first or second rate. The backpressure valve open at the first rate when an amount of soot in the particulate filter falls below a threshold and the backpressure valve may open at the second rate when a load on the engine increases. The first rate may actuate the backpressure valve in greater than one second and the second rate may actuate the backpressure valve in less than one second.

Also disclosed is a method of controlling a power system comprising operating the power system in a first operation mode, operating the power system in a second operation mode to assist regeneration of a particulate filter, transitioning the power system from the second operation mode to the first operation mode over a first period of time in response to an amount of soot in the particulate filter falling below a threshold, and transitioning the power system from the second operation mode to the first operation mode over a second period of time less than the first period of time in response to a load on the power system increasing more than a threshold amount. The second operation mode may include actuating a regeneration valve and the regeneration valve may actuate over a period of time greater than one second in response to the amount of soot in the particulate filter falling below a threshold and actuating the regeneration valve over a period of time less than one second in response to a load on the power system increasing more than a threshold amount. The second operation mode may include closing a regeneration valve and the regeneration valve may open over a period of time greater than one second in response to the amount of soot in the particulate filter falling below a threshold and may open over a period of time less than one second in response to a load on the power system increasing more than a threshold amount. The regeneration valve may be a backpressure valve disposed in an exhaust conduit. The backpressure valve may open over a period of time greater than one second in response to the amount of soot in the particulate filter falling below a threshold and may open over a period of time less than one second in response to the load on the power system increasing more than a threshold amount. The power system may operate under the second operation mode after an amount of soot in the particulate filter is above a threshold and the load on the power system is below a threshold amount for a current engine speed.

A power system is also disclosed comprising an engine that produces exhaust, a particulate filter that traps soot from the engine, and a controller that switches the power system from a first operation mode into a second operation mode to regenerate the particulate filter in response to a load on the engine changing and a threshold amount of time greater than zero passing after the load on the engine changed. The controller may switch the power system from the first operation mode into the second operation mode when the load on the engine decreases below a threshold for a current engine speed. The controller may also switch the power system from the first operation mode into the second operation mode when the load on the engine decreases below a threshold for a current engine speed and an amount of soot in the particulate filter is above a threshold. The second operation mode may also include a closing of a regeneration valve. The regeneration valve may be a backpressure valve disposed in an exhaust conduit routing the exhaust. The second operation mode may include one or more of: closing a backpressure valve disposed in an exhaust conduit of the engine; increasing a engine fuel injection pressure; closing an exhaust gas recirculation valve disposed in an exhaust gas recirculation system that recirculates the exhaust from the engine back to an intake of the engine; changing a fuel injection timing of when a main injection of fuel is injected into the engine relative to the position of a piston in the engines and injecting a shot of fuel either before or after the main injection wherein the shot of fuel is smaller than the main injection. The threshold amount of time may be greater than ten seconds. The threshold amount of time may also decrease as an amount of soot in the particulate filter rises. The threshold amount of time may be greater than ten seconds and decrease to less than ten seconds if the amount of soot in the particulate filter is more than 10% above the threshold.

A power system is also disclosed comprising an engine that produces exhaust, an exhaust conduit routing the exhaust, a backpressure valve disposed in the exhaust conduit, and a controller delaying operation of the backpressure valve after an engine load changes. The operation of the backpressure valve may be delayed for a period of time greater than ten seconds. The controller may operate the backpressure valve to regenerate a particulate filter disposed in the exhaust conduit. The controller may also operate the backpressure valve after an amount of soot in the particulate filter exceeds a threshold. The operation of the backpressure valve may be delayed for a period of time that decreases as the amount of soot in the particulate filter rises beyond the threshold. The operation of the backpressure valve may also be delayed for a period of time greater than ten seconds if the amount of soot in the particulate filter is within 5% of the threshold and a period of time less than ten seconds if the amount of soot in the particulate filter is more than 10% above the threshold.

Also disclosed is a method of controlling a power system comprising operating the power system under a first operation mode, detecting a change in load on the power system, waiting a threshold amount of time greater than zero after detecting a change in load on the power system, and operating the power system under a second operation mode to assist regeneration of a particulate filter after waiting the threshold amount of time. The method may also include detecting an amount of soot in the particulate filter, and operating the power system under the second operation mode after waiting the threshold amount of time and after detecting the amount of soot is above a threshold. The threshold amount of time may be greater than ten seconds if the amount of soot in the particulate filter is within 5% of the threshold and may decrease to less than ten seconds if the amount of soot in the particulate filter is more than 10% above the threshold. The change in load on the power system may be a decrease in load below a threshold amount for a current engine speed. The second operation mode may include closing a backpressure valve disposed in an exhaust conduit.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A power system comprising:
an engine configured to produce exhaust; a particulate filter configured to trap soot from the engine; and
a controller configured to:
switch the power system from a first operation mode to a second operation mode configured to regenerate the particulate filter,
transition the power system from the first operation mode to the second operation mode over a first period of time in response to an amount of soot in the particulate filter changing relative to a threshold,
transition the power system from the first operation mode to the second operation mode over a second period of time less than the first period of time in response to a lond on the power system changing.

2. The power system of claim 1, wherein the second operation mode includes actuating a regeneration valve, and the regeneration valve actuates at a slower rate when the amount of soot in the particulate filter changes relative to the threshold than when the load on the engine increases.

3. The power system of claim 1, wherein a transition from the second operation mode back to the first operation mode occurs at the slower rate when the amount of soot in the particulate filter falls below the threshold than when the load on the engine increases.

4. The power system of claim 3, wherein the second operation mode includes a closing of a regeneration valve, and the regeneration valve opens at the slower rate when the amount of soot in the particulate filter falls below the threshold than when the load on the engine increases.

5. The power system of claim 4, wherein the regeneration valve is a backpressure valve disposed in an exhaust conduit routing the exhaust.

6. The power system of claim 5, wherein the backpressure valve opens in greater than one second when the amount of soot in the particulate filter falls below the threshold, and the backpressure valve opens in less than one second when the load on the engine increases.

7. The power system of claim 6, wherein the backpressure valve opens in greater than two seconds when the amount of soot in the particulate filter falls below the threshold, and the backpressure valve opens in less than one second when the load on the engine increases.

8. The power system of claim 5, wherein the controller delays operation of the backpressure valve after an engine mode changes.

9. The power system of claim 8, wherein the operation of the backpressure valve is delayed for a period of time greater than ten seconds.

10. The power system of claim 9, wherein the operation of the backpressure valve is delayed for a period of time that decreases as the amount of soot in the particulate filter rises beyond the threshold.

11. The power system of claim 10, wherein the operation of the backpressure valve is delayed for a period of time greater than 10 seconds when the amount of soot in the particulate filter is within 5% of the threshold, and a period of time less than ten seconds when the amount of the soot in particulate filter is more than 10% above the threshold.

12. A method of controlling an engine power system to assist regeneration of a particulate filter, the method comprising:
operating the power system in a first operation mode;
operating the power system in a second operation mode to assist regeneration of a particulate filter;
transitioning the power system from the second operation mode to the first operation mode over a first period of time in response to an amount of soot in the particulate filter falling below a threshold; and
transitioning the power system from the second operation mode to the first operation mode over a second period of time less than the first period of time in response to a load on the power system increasing more than a threshold amount, the second operation mode including actuating a regeneration valve over a period of time greater than one second in response to the amount of soot in the particulate filter falling below a threshold, and actuating the regeneration valve over a period of time less than one second in response to the load on the power system increasing more than a threshold amount.

13. The method of claim 12, wherein the second operation mode includes closing a regeneration valve, and the regeneration valve opens over a period of time greater than one second in response to the amount of soot in the particulate filter falling below a threshold, and opens over a period of time of less of one second in response to a load on the power system increasing more than the threshold amount.

14. The method of claim 13, wherein the regeneration valve is a backpressure valve disposed in an exhaust conduit of the engine.

15. The method of claim 14, wherein the backpressure valve opens over a period of time greater than one second in response to the amount of soot in the particulate filter falling below a threshold, and opens over a period of time of less than one second in response to the load on the power system increasing more than a threshold amount.

16. The method of claim 12, wherein the system operates under the second operation mode after an amount of soot in the particulate filter is above a threshold and the load on the power system is below a threshold amount for a current engine speed.

* * * * *